US010883909B2

(12) United States Patent
Primrose et al.

(10) Patent No.: US 10,883,909 B2
(45) Date of Patent: Jan. 5, 2021

(54) APPARATUS FOR MEASURING RHEOLOGICAL PROPERTIES AND VELOCITIES OF A FLUID

(71) Applicant: Industrial Tomography Systems PLC, Manchester (GB)

(72) Inventors: Kenneth Primrose, Manchester (GB); Changhua Qiu, Manchester (GB); Kent Wei, Manchester (GB)

(73) Assignee: Industrial Tomography Systems PLC, Manchester (GB)

( * ) Notice: Subject to any disclaimer, the term of this patent is extended or adjusted under 35 U.S.C. 154(b) by 249 days.

(21) Appl. No.: 15/772,792

(22) PCT Filed: Nov. 2, 2016

(86) PCT No.: PCT/GB2016/053397
§ 371 (c)(1),
(2) Date: May 1, 2018

(87) PCT Pub. No.: WO2017/077293
PCT Pub. Date: May 11, 2017

(65) Prior Publication Data
US 2019/0250084 A1    Aug. 15, 2019

(30) Foreign Application Priority Data
Nov. 2, 2015   (GB) .................................. 1519363.4

(51) Int. Cl.
*G01N 11/02*    (2006.01)
*G01F 1/56*    (2006.01)
(Continued)

(52) U.S. Cl.
CPC ............... *G01N 11/02* (2013.01); *G01F 1/56* (2013.01); *G01F 1/588* (2013.01); *G01P 5/08* (2013.01); *G01N 2011/0066* (2013.01)

(58) Field of Classification Search
CPC ... G01F 1/56; G01F 1/58; G01F 1/584; G01F 1/588; G01F 1/712; G01N 11/02; G01N 2011/0066
(Continued)

(56) References Cited

U.S. PATENT DOCUMENTS 3,937,080 A * 2/1976 Fix ........................... G01F 1/588
73/861.15
4,363,244 A * 12/1982 Rabeh ..................... G01F 1/582
324/453

(Continued)

FOREIGN PATENT DOCUMENTS

EP    0510744    10/1992
EP    1607739 A1    12/2005
(Continued)

OTHER PUBLICATIONS

International Search Report and Written Opinion for Application No. PCT/GB2016/053397 dated Feb. 28, 2017 (17 pages).
(Continued)

Primary Examiner — Suman K Nath
(74) Attorney, Agent, or Firm — Michael Best & Friedrich LLP

(57) ABSTRACT

A measurement apparatus comprising: a plurality of first electrodes, each of the first electrodes being spaced apart by at least a first predetermined spacing; a plurality of second electrodes, each of the second electrodes being spaced apart by at least a second predetermined spacing less than the first predetermined spacing; an energisation source arranged to energise at least one of said first electrodes so as to cause an electric field to be established between at least one pair of said first electrodes, and to energise at least one of said second electrodes so as to cause an electric field to be established between at least one pair of said second electrodes; a monitor arranged to monitor an electrical parameter
(Continued)

at at least one of said first electrodes in response to said energisation of at least one of said first electrodes and to monitor an electrical parameter at at least one of said second electrodes in response to said energisation of at least one of said second electrodes; and a controller arranged to generate data indicative of a property of a material within a first region extending a first distance from the first electrodes, and to generate data indicative of a property of a material within a second region extending a second distance, less than the first distance, from the second electrodes, based upon said monitored electrical parameters.

20 Claims, 17 Drawing Sheets

(51) Int. Cl.
  *G01P 5/08* (2006.01)
  *G01F 1/58* (2006.01)
  *G01N 11/00* (2006.01)
(58) Field of Classification Search
  USPC .......................................... 73/54.42, 861.15
  See application file for complete search history.

(56) References Cited

U.S. PATENT DOCUMENTS

| | | | |
|---|---|---|---|
| 5,275,059 A | | 1/1994 | Lew et al. |
| 6,655,221 B1 * | | 12/2003 | Aspelund ............... G01F 1/363 |
| | | | 73/861.04 |
| 2007/0186679 A1 | | 8/2007 | Zangl et al. |
| 2010/0332170 A1 | | 12/2010 | Gao et al. |

FOREIGN PATENT DOCUMENTS

| | | |
|---|---|---|
| EP | 2343541 A1 | 7/2011 |
| WO | 9506854 | 3/1995 |
| WO | 02103376 | 12/2002 |
| WO | 2015118332 A1 | 8/2015 |
| WO | 2016032593 | 3/2016 |

OTHER PUBLICATIONS

United Kingdom Patent Office Search Report for Application No. 1519363.4 dated Apr. 22, 2016, 5 pages.

* cited by examiner

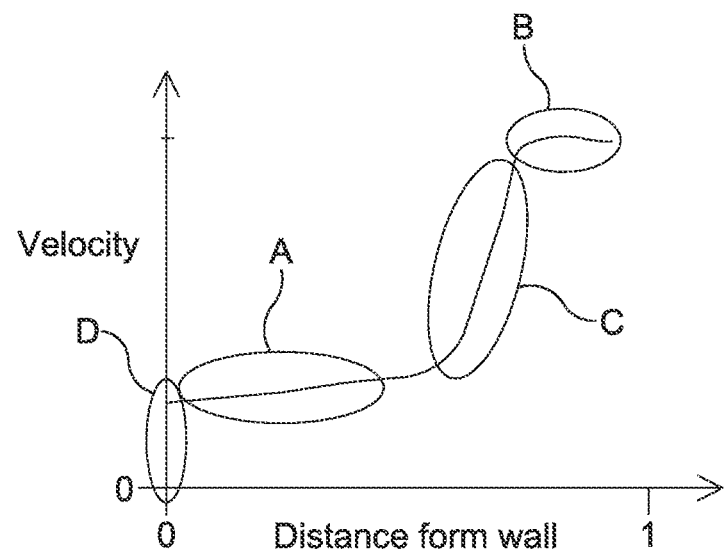
Fig. 5
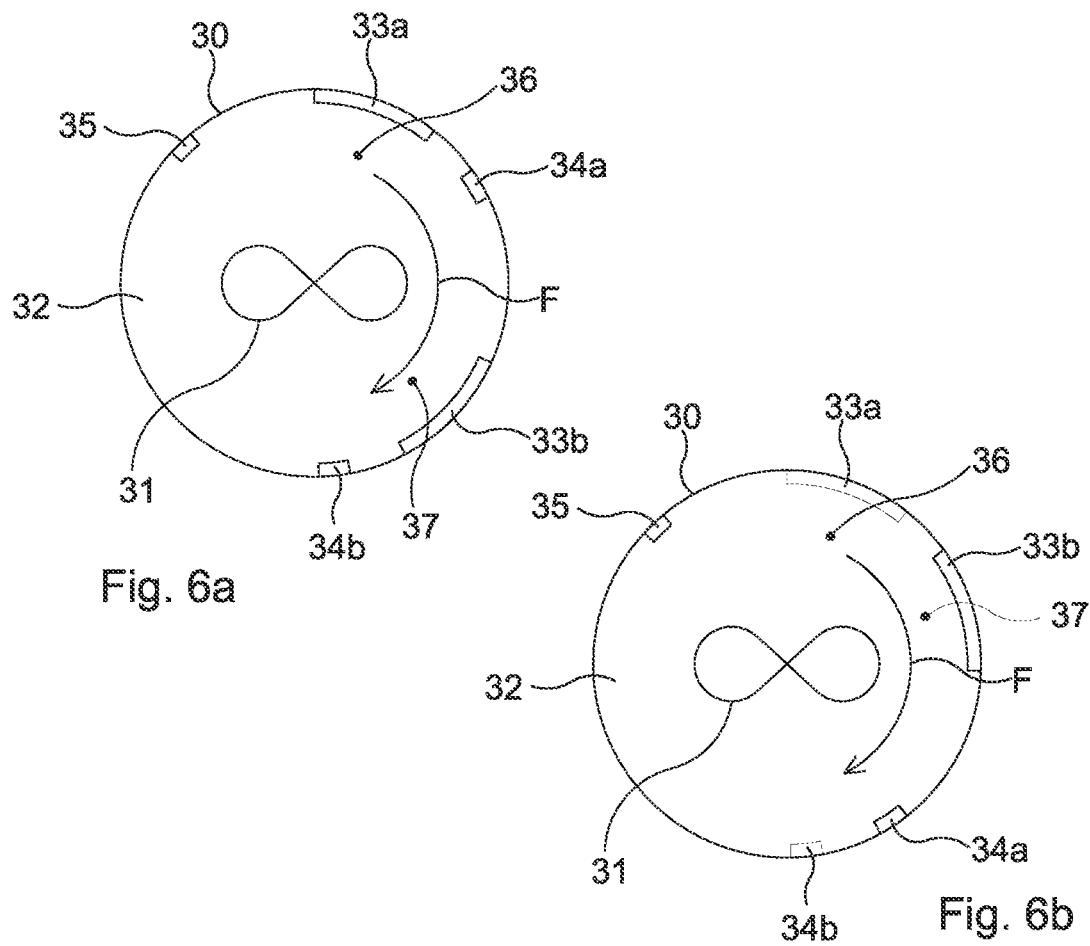
Fig. 6a
Fig. 6b

APPARATUS FOR MEASURING RHEOLOGICAL PROPERTIES AND VELOCITIES OF A FLUID

FIELD OF THE INVENTION

The present invention relates to a measurement apparatus and method of operating the same. More particularly, but not exclusively, the invention relates to a measurement apparatus and method for measuring the velocity of a material flowing within a pipe or vessel.

BACKGROUND

Rheology refers to the study of flow of matter in response to an applied force. In general, matter studied by rheology is in a liquid state, however, mixtures of liquids and solids (e.g. suspensions) may also be studied. Rheology allows the effects of viscosity on the flow of matter in industrial applications to be better understood. For example, the transport of material in pipes, or the mixing of material in a vessel, are both complex systems in which the viscosity of the material in question leads to complicated flow patterns throughout the material, and in particular at the walls of the pipe or vessel.

Tomography refers to the use of some form of penetrating wave to image a region of interest. Generally, an image is constructed by the combination of a plurality of image sections. Tomography is often applied to industrial processes, and may be used to study rheology. The penetrating waves used in tomography may be generated by electric or magnetic fields. Electrical resistance tomography (ERT) uses electrodes placed around the region of interest to monitor resistivity within the region of interest, and can be used for example to monitor characteristics of mixtures of conductive fluids in pipes. Electrical capacitance tomography (ECT) also uses electrodes placed around the region of interest, but monitors electrical permittivity within the material of interest. ECT can thus be used to distinguish between materials having different electrical permittivities.

Known tomography apparatus and methods generally provide a ring of electrodes spaced apart around the periphery of a body to be imaged. Various combinations of the electrodes are energised, and signals are detected from either those electrodes which are energised, or other ones of the electrodes, depending on the energisation scheme used. A variety of energisation and detection schemes are known in the art. Both resistance and capacitance tomography may be used in such an arrangement.

SUMMARY

In known apparatus, in which a ring of electrodes is provided around the periphery of a body, detailed information relating to the rheology of the material within the body is generally available only in the central region of the body, and in the plane of the ring of electrodes. Detailed information is not, however, generally available about the distribution of material throughout the body, and in particular in the regions proximate to the body walls. Further, where rings of electrodes are provided, each ring generally provides information about material in the plane of that ring only, rather than providing information about the distribution of material along the length of the body.

It is an object of the present invention to provide an apparatus which overcomes one or more of the problems associated with known tomography apparatus, discussed above or otherwise.

According to a first aspect of the invention, there is provided a measurement apparatus comprising: a plurality of first electrodes, each of the first electrodes being spaced apart by at least a first predetermined spacing; a plurality of second electrodes, each of the second electrodes being spaced apart by at least a second predetermined spacing less than the first predetermined spacing; an energisation source arranged to energise at least one of said first electrodes so as to cause an electric field to be established between at least one pair of said first electrodes, and to energise at least one of said second electrodes so as to cause an electric field to be established between at least one pair of said second electrodes; a monitor arranged to monitor an electrical parameter at at least one of said first electrodes in response to said energisation of at least one of said first electrodes and to monitor an electrical parameter at at least one of said second electrodes in response to said energisation of at least one of said second electrodes; and a controller arranged to generate data indicative of a property of a material within a first region extending a first distance from the first electrodes, and to generate data indicative of a property of a material within a second region extending a second distance, less than the first distance, from the second electrodes, based upon said monitored electrical parameters.

The use of a plurality of first electrodes which allows measurements to be taken deep into the material, and a plurality of second electrodes which allows measurements to be taken with a higher resolution, but a relatively shallow depth, allows detailed information relating to the distribution of the material to be obtained. The plurality of first electrodes may be referred to as far-field array while the plurality of second electrodes may be referred to as a near-field array.

The measurement apparatus of the first aspect does not require apparatus arranged to generate a magnetic field in order for measurements to be performed. Rather, at least one of the first electrodes is energised by the energisation source to establish an electric field between at least one pair of the first electrodes, and at least one of the second electrodes is energised by the energisation source to establish an electric field between at least one pair of the second electrodes. That is, the same electrodes (or at least electrodes within the same arrays) are used both to generate an electric field and to perform measurements relating to the generated electric field.

The second predetermined spacing may be less than half the first predetermined spacing. The second distance may be less than half the first distance.

The plurality of first electrodes may comprise an array of first electrodes. The plurality of second electrodes may comprise an array of second electrodes. The array of electrodes may be a linear array.

The property of the material may be a velocity of the material.

The measurement apparatus may further comprise a disruption source, the disruption source being arranged to introduce a disruption to a flow of material. The controller may be arranged to detect an effect of said disruption.

The disruption source may be a heater.

The measurement apparatus may further comprise a second plurality of first electrodes.

The controller may be arranged to generate data indicative of a relationship between an electrical parameter monitored at at least one of said plurality of first electrodes in response to said energisation of at least one of said plurality of first electrodes and an electrical parameter monitored at at least one of said second plurality of first electrodes in response to said energisation of at least one of said second plurality of first electrodes.

The controller may be configured to determine a relationship between the parameter monitored at the at least one of said plurality of first electrodes, and the parameter monitored at the at least one of said second plurality of first electrodes. The data indicative of a property of the material may be based upon the determined relationship.

The measurement apparatus may further comprise: a plurality of third electrodes, each of the third electrodes being spaced apart by at least a third predetermined spacing. The third predetermined spacing may be less than the first predetermined spacing and greater than the second predetermined spacing. The energisation source may be further arranged to energise at least one of said third electrodes so as to cause an electric field to be established between at least one pair of said third electrodes. The monitor may be further arranged to monitor an electrical parameter at at least one of said third electrodes in response to said energisation of at least one of said third electrodes. The controller may be further arranged to generate data indicative of a property of a material within a third region extending a third distance from the third electrodes based upon the monitored electrical parameters, wherein the third distance is less than the first distance and greater than the second distance.

The plurality of first electrodes are able to sense material at a greater depth than the plurality of third electrodes, which are, in turn, able to sense material at a greater depth than the plurality of second electrodes. That is, the depth of the material from the plurality of first electrodes which significantly influences the measurement performed by the plurality of first electrodes is greater than the depth of the material from the plurality of third electrodes which significantly influences measurements performed by the plurality of third electrodes, which is in turn greater than the depth of the material from the plurality of second electrodes which significantly influences measurements performed by the plurality of second electrodes. Therefore, the respective pluralities of first, second and third electrodes have different respective depth sensitivities. The use of the pluralities of first, second and third electrodes allows the generation of data indicative of a property of the material within regions extending different distances from the electrodes, which in turn allows for more accurate and reliable results to be generated by the measurement apparatus.

The measurement apparatus may further comprise a further plurality of first electrodes, which are spaced apart from the plurality of first electrodes in a direction of flow of the material. Each of the further plurality of first electrodes may be spaced apart from each other by at least the first predetermined spacing.

The energisation source may be arranged to further energise at least one of said further plurality of first electrodes so as to cause an electric field to be established between at least one pair of said further plurality of first electrodes. The monitor may be arranged to monitor an electrical parameter at at least one of said further plurality of first electrodes in response to said energisation of at least one of said further plurality of first electrodes. The controller may be arranged to determine a relationship between the parameter monitored at the at least one of the plurality of first electrodes, and the parameter monitored at the at least one of the further plurality of first electrodes, and to generate data indicative of a property of the material within a region between the plurality of first electrodes and the further plurality of first electrodes based upon said determined relationship.

The measurement apparatus may further comprise a further plurality of second electrodes, which are spaced apart from the plurality of second electrodes in a direction of flow of the material. Each of the further plurality of second electrodes may be spaced apart from each other by at least the second predetermined spacing.

The energisation source may be arranged to further energise at least one of said further plurality of second electrodes so as to cause an electric field to be established between at least one pair of said further plurality of second electrodes. The controller may be arranged to determine a relationship between an electrical parameter monitored by the monitor at at least one of the plurality of second electrodes, and an electrical parameter monitored by the monitor at at least one of the further plurality of second electrodes, and to generate data indicative of a property of the material within a region between the plurality of second electrodes and the further plurality of second electrodes based upon said determined relationship.

The measurement apparatus may further comprise a further plurality of third electrodes, which are spaced apart from the plurality of third electrodes in a direction of flow of the material. Each of the further plurality of third electrodes may be spaced apart from each other by at least the third predetermined spacing.

The energisation source may be arranged to further energise at least one of said further plurality of third electrodes so as to cause an electric field to be established between at least one pair of said further plurality of third electrodes. The controller may be arranged to determine a relationship between an electrical parameter monitored by the monitor at at least one of the plurality of third electrodes, and an electrical parameter monitored by the monitor at at least one of the further plurality of third electrodes, and to generate data indicative of a property of the material within a region between the plurality of third electrodes and the further plurality of third electrodes based upon said determined relationship.

One or more of the plurality of first electrodes, the plurality of second electrodes, the plurality of third electrodes, the further plurality of first electrodes, the further plurality of second electrodes and the further plurality of third electrodes may be arranged along a direction of flow of the material. That is, each of the electrodes within a particular plurality of electrodes (which may, for example, be a linear array) may be spaced apart from each of the other electrodes within that particular plurality of electrodes in the direction of flow of the material.

Alternatively, one or more of the plurality of first electrodes, the plurality of second electrodes, the plurality of third electrodes, the further plurality of first electrodes, the further plurality of second electrodes and the further plurality of third electrodes may be arranged in a direction substantially perpendicular to the direction of flow of the material. That is, each of the electrodes within a particular plurality of electrodes may be spaced apart from each of the other electrodes within that particular plurality of electrodes in a direction substantially perpendicular to the direction of flow of the material.

One or more of the plurality of first electrodes, the plurality of second electrodes, the plurality of third electrodes, the further plurality of first electrodes, the further plurality of second electrodes and the further plurality of third electrodes may be arranged along a helical path, where an axis of the helical path is parallel to the direction of flow of the material.

According to a second aspect of the invention there is provided a measurement apparatus comprising: a first plurality of first electrodes extending in a direction of flow of a material; a second plurality of first electrodes extending in a direction of flow of a material, the second plurality of first electrodes being spaced apart from the first plurality of first electrodes in a direction of flow of a material; an energisation source arranged to energise at least one of said first plurality of first electrodes so as to cause an electric field to be established between at least one pair of said first plurality of first electrodes, and to energise at least one of said second plurality of first electrodes so as to cause an electric field to be established between at least one pair of said second plurality of first electrodes; a monitor arranged to monitor an electrical parameter at at least one of said first plurality of first electrodes in response to said energisation of at least one of said first plurality of first electrodes and to monitor an electrical parameter at at least one of said second plurality of first electrodes in response to said energisation of at least one of said second plurality of first electrodes; and a controller arranged to determine a relationship between the parameter monitored at the at least one of the first plurality of first electrodes, and the parameter monitored at the at least one of the second plurality of first electrodes, and to generate data indicative of a property of the material within a region between the first and second pluralities of first electrodes based upon said determined relationship.

The use of first and second pluralities of first electrodes which extend in the direction of flow of the material allow measurements to be taken in which the acquired data provides a sensing plane which is substantially parallel to a direction of flow. Thus, by comparing measured data at different points in time and at different positions in the direction of flow, it is possible to determine information indicative of the material flow distribution, such as, for example the rate of flow of material between the first and second pluralities of first electrodes. Moreover, the alignment of the sensing plane with the direction of flow (as opposed to being perpendicular to the direction of flow) allows additional information regarding the flow distribution to be obtained. That is, different sub-regions within the sensing plane along the direction of flow may correspond to positions along a flow path for a particular portion of material as it moves in the direction of flow. As such, by using a plurality of first electrodes which are distributed along the direction of flow of a material, and by taking measurements at a plurality different points in time, it is possible to derive information indicative of the rate of movement of the material adjacent to the pluralities of first electrodes, and also the different rate of movement of the material at different positions around the pluralities of first electrodes.

The region between the first and second pluralities of first electrodes may comprise a region extending a first distance from the first and second pluralities of first electrodes.

Each of the first plurality of first electrodes may be spaced apart by at least a first predetermined spacing. Each of the second plurality of first electrodes may be spaced apart by at least the first predetermined spacing.

The measurement apparatus may further comprise a plurality of second electrodes and a further plurality of second electrodes, the further plurality of second electrodes being spaced apart from the plurality of second electrodes in the direction of flow of the material.

Each of the plurality of second electrodes may be spaced apart by at least a second predetermined spacing. Each of the further plurality of second electrodes may be spaced apart by at least the second predetermined spacing. The second predetermined spacing may be less than the first predetermined spacing. The second predetermined spacing may be less than half the first predetermined spacing.

The plurality and further plurality of second electrodes may be spaced apart from the first and second pluralities of first electrodes in the direction of flow of the material.

The controller may be arranged to generate data indicative of a relationship between an electrical parameter monitored at at least one of said plurality of second electrodes in response to said energisation of at least one of said plurality of second electrodes and an electrical parameter monitored at at least one of said further plurality of second electrodes in response to said energisation of at least one of said further plurality of second electrodes.

The controller may be configured to determine a second relationship between the parameter monitored at the at least one of said plurality of second electrodes, and the parameter monitored at the at least one of said further plurality of second electrodes, and to generate data indicative of a second property of the material within a region between the plurality and further plurality of second electrodes based upon said determined second relationship.

The region between the plurality and the further plurality of second electrodes may comprise a region extending a second distance from the plurality and the further plurality of second electrodes, the second distance being less than the first distance. The second distance may be is less than half the first distance.

The plurality of first electrodes may comprise an array of electrodes. The further plurality of first electrodes may comprise an array of electrodes. One or more of the arrays of electrodes may be a linear array.

The plurality of second electrodes may comprise an array of second electrodes. The further plurality of second electrodes may comprise an array of second electrodes. One or more of the arrays of second electrodes may be a linear array.

The property of the material may be a velocity of the material. The second property of the material may be a velocity of the material.

The measurement apparatus may further comprise a disruption source, wherein the disruption source is arranged to introduce a disruption to a flow of material, and wherein the controller is arranged to detect an effect of said disruption. The disruption source may comprise a heater.

The controller may be arranged to determine a velocity distribution of the material within the region between the first and second pluralities of first electrodes based upon said determined relationship.

The controller may be arranged to determine a velocity distribution of the material within the region between the plurality and a further plurality of second electrodes based upon said determined second relationship.

The controller may be further arranged to obtain reference data indicative of a reference property of a material, and to determine a relationship between said data indicative of the property of the material and the reference data.

The controller may be arranged to perform a comparison between said determined relationship and a predetermined criterion.

The reference data may comprise a model velocity distribution. The reference data may be data obtained by previous measurements or based upon physical models.

The controller may be arranged to generate data indicative of a viscosity of the material. The data indicative of a viscosity of the material may be a viscosity of the material.

The data indicative of a viscosity of the material may data indicating a change in viscosity of the material and/or data indicating a relative viscosity of the material.

The controller may be arranged to compare the data indicative of a viscosity of the material to a reference viscosity profile which corresponds to a predetermined material characteristic. The controller may be arranged to determine whether a characteristic of the material is equal to the predetermined material characteristic. The predetermined material characteristic may be a predetermined mass fraction of the material.

The controller may be arranged to generate data indicative of the rheology of the material. The data indicative of the rheology of the material may comprise a rheological parameter, such as, for example, a rheological parameter representative of the effective viscosity of the material.

The controller may be arranged to generate data indicative of the rheology of Newtonian fluids and/or non-Newtonian fluids.

The controller may be arranged to determine a flow velocity profile of the material based upon the generated data using a fitting algorithm.

The fitting algorithm may be a Gauss-Newton algorithm. The Gauss-Newton algorithm may be provided with data indicative of relationships between properties of the material. For example, data indicative of a relationship between various fluid properties may comprise fluid flow models, such as for example, Newtonian fluid model, Power-law fluid model, and Herschel-Bulkley fluid model.

According to a third aspect of the invention there is provided a measurement apparatus comprising: a plurality of electrodes extending in a direction of flow of a material; an energisation source arranged to energise at least one of said plurality of electrodes so as to cause an electric field to be established between at least one pair of said plurality of electrodes during a first time period, and to energise at least one of said plurality of electrodes so as to cause an electric field to be established between at least one pair of said plurality of electrodes during a second time period; and a monitor arranged to monitor an electrical parameter at at least one of said plurality of electrodes in response to said energisation of at least one of said plurality of electrodes at during the first time period, and in response to said energisation of at least one of said plurality of electrodes during the second time period; and a controller arranged to determine a relationship between the parameter monitored at the at least one of the plurality of electrodes during the first time period and during the second time period, and to generate data indicative of a property of the material within a region extending from the plurality of electrodes based upon said determined relationship.

The use of a plurality of electrodes which extend in the direction of flow of the material allow measurements to be taken in which the acquired data provides a sensing plane which is substantially parallel to a direction of flow. Thus, by comparing measured data at different time periods and at different positions in the direction of flow (i.e. at different sub-regions within the sensing plane), it is possible to determine information indicative of the material flow distribution, such as, for example the rate of flow of material past the plurality of electrodes. Different sub-regions within the sensing plane along the direction of flow may correspond to positions along a flow path for a particular portion of material as it moves in the direction of flow. As such, by using a plurality of electrodes which are distributed along the direction of flow of a material (whether in a single array, or a plurality of arrays), and by taking measurements at a plurality different points in time, it is possible to derive information indicative of the rate of movement of the material adjacent to the pluralities of electrodes, and also the different rate of movement of the material at different positions around the pluralities of electrodes.

Features described in combination with the first and second aspects of the invention may be used in combination with the third aspect of the invention.

According to a fourth aspect of the invention there is provided a measurement apparatus comprising: a plurality of first electrodes; an energisation source arranged to energise at least one of said plurality of first electrodes so as to cause an electric field to be established between at least one pair of said plurality of first electrodes; a monitor arranged to monitor an electrical parameter at at least one of said plurality of first electrodes in response to said energisation of at least one of said plurality of first electrodes; and a controller. The controller may be arranged to generate a plurality of data items based upon the monitored electrical parameters, each data item being indicative of a property of a material within a respective sub-region within said apparatus, wherein each of the plurality of sub-regions is associated with a respective predetermined nominal depth extending into the measurement apparatus from the plurality of first electrodes. The controller may be further arranged to generate a plurality of depth data items, each of the plurality of depth data items being associated with a respective one of the plurality of data items indicative of a property of a material. Said generation of each of said a plurality of depth data items may be based upon a respective predetermined nominal depth and one of a respective plurality of depth factors, each of the plurality of depth factors being associated with a respective one of the plurality of sub-regions within said apparatus.

The plurality of depth factors may thus be used to adjust data (such as, for example, velocity data) generated by the controller based upon said monitored electrical parameters so as to ensure that the data indicative of a property of the material is associated with a correct depth extending from the plurality of first electrodes into the measurement apparatus.

The use of a plurality of depth factors allows non-linear scaling to be applied to the obtained data. That is, rather than a uniform scaling factor being applied to all of the measurement data, different depth factors can be applied as appropriate based upon the sub-region location. It has been realised that the energisation field penetration depth into the material is less than expected, resulting in measurements which are interpreted as being indicative of material further from the sensor surface than is correct. The use of a plurality of depth factors allows such errors to be corrected, without unduly affecting the apparent depth of measurements relating to different sub-regions. That is, an appropriate depth scaling factor may be applied to each sub-region.

The predetermined nominal depth associated with each of the plurality of sub-regions the extending into the measurement apparatus may be determined based upon an expected distribution of said electric field within said material. The sub-regions may, for example, be distributed so as to extend in a direction parallel to the pipe wall. Each sub-region may be associated with a predetermined nominal distance (or range of distances) from the pipe wall (i.e. a predetermined nominal depth into the pipe).

The controller is arranged to generate each of the depth data items based upon geometry data.

The geometry data may be associated with the plurality of first electrodes. Said geometry data associated with the first plurality of first electrodes may comprise a length of said first plurality of first electrodes.

Each of the plurality of depth data items may be proportional to a length of the plurality of first electrodes.

By the length of the first plurality of first electrodes it is meant a distance, in a direction in which the plurality of first electrodes extends, between the electrodes which are energised and monitored so as to generate data indicative of said property of said material.

Each of the plurality of depth data items may be generated based upon a relationship between said respective predetermined nominal depth and said respective one of the plurality of depth factors.

Each of the plurality of depth data items may be generated by dividing said respective predetermined nominal depth by said respective one of the plurality of depth factors.

A first one of the plurality of depth factors may correspond to a first one of said plurality of sub-regions and a second one of the plurality of depth factors may correspond to a second one of said plurality of sub-regions. Said first one of said plurality of sub-regions may be further from the first plurality of electrodes than said second one of said plurality of sub-regions. Said first one of the plurality of depth factors may be greater than said second one of the plurality of depth factors.

Alternatively, each of the plurality of depth data items may be generated by multiplying said respective predetermined nominal depth by said respective one of the plurality of depth factors. A first one of the plurality of depth factors may correspond to a first one of said plurality of sub-regions and a second one of the plurality of depth factors may correspond to a second one of said plurality of sub-regions. Said first one of said plurality of sub-regions may be further from the first plurality of electrodes than said second one of said plurality of sub-regions. Said first one of the plurality of depth factors may be less than said second one of the plurality of depth factors.

The controller may be arranged to generate said plurality of depth factors based upon data indicative of a property of a reference material.

Said data indicative of a property of the reference material may be obtained by said measurement apparatus. The data indicative of a property of a reference material may be obtained based upon measurements performed by the measurement apparatus. The data indicative of a property of a reference material may comprise a velocity flow profile.

The plurality of depth factors may be generated based upon a comparison between measurements performed by the measurement apparatus, and a reference flow profile.

The reference material may be caused to flow through the measurement apparatus with the reference flow profile. The reference flow profile may comprise a predetermined velocity profile. The reference material may comprise a material having known characteristics.

In this way, the plurality of depth factors, which have been generated based upon the flow of a reference material, can be used to improve the accuracy of the data indicative of a property of the material. In particular, the plurality of depth factors may be applied to data generated based upon measurements performed by each of the pluralities of electrodes so as to correct for irregularities in the depth sensitivity of the respective pluralities of electrodes.

Adjusting the generated data may comprise applying a depth factor to the generated data. A depth factor may be used for mapping the generated data to a corresponding depth within the measurement apparatus.

The controller may be arranged to generate the plurality of depth factors during an initialisation procedure of the measurement apparatus. The generation of the plurality of depth factors may be repeated periodically during the operation of the measurement apparatus. Alternatively, the plurality of depth factors may be obtained from measurements performed by an alternative measurement apparatus having similar characteristics to the measurement apparatus, or characteristics having a known relationship with characteristics of the measurement apparatus.

Features described above in relation to the fourth aspect of the invention (i.e. the use of a plurality of depth factors) are described in combination with a plurality of first electrodes. However, it will be appreciated that these techniques may also be applied to measurements performed using pluralities of second and/or third electrodes and/or further pluralities of first and/or second and/or third electrodes, as described above with reference to any of the first, second or third aspects of the invention.

According to a further aspect of the invention there is provided a method of generating the plurality of depth factors for use in the measurement apparatus according to any of the first second, third, or fourth aspects of the invention.

The method may comprise the steps of: providing a reference material with a predetermined reference flow profile; energising, by the energisation source, at least one of said electrodes so as to cause an electric field to be established between at least one pair of said electrodes; monitoring, by the monitor, an electrical parameter at at least one of said electrodes in response to said energisation of at least one of said electrodes; generating, by the controller, data indicative of a property of the reference material, based upon the monitored electrical parameters; comparing the generated data to the reference flow profile; and generating the reference data based upon results of the step of comparing.

According to a fifth aspect of the invention there is provided a measurement apparatus comprising a pipe, wherein, in use, a material is caused to flow within the pipe, a plurality of first electrodes associated with a surface of the pipe, each of the first electrodes being spaced apart by at least a first predetermined spacing in a direction of flow of material within said pipe; an energisation source arranged to energise at least one of said first electrodes so as to cause an electric field to be established between at least one pair of said first electrodes; a monitor arranged to monitor an electrical parameter at at least one of said first electrodes in response to said energisation of at least one of said first electrodes; and a controller arranged to generate data indicative of a property of material within a first region of said pipe extending a first distance from said surface of the pipe, based upon said monitored electrical parameters. A width of at least one of the first electrodes in a direction substantially perpendicular to the direction of flow of material within the pipe is at least 20% of a perimeter of the pipe.

The direction substantially perpendicular to the direction of flow of material within the pipe may be a circumferential direction. The direction of flow of material within the pipe may be substantially parallel with a longitudinal axis of the pipe. The pipe may have a circular cross-section. The circumferential direction of the pipe may be defined as a direction perpendicular to the longitudinal axis of the pipe.

The surface may be an inner surface of the pipe. At least one of the first electrodes may be positioned on said inner surface of the pipe. Each of the first electrodes may be positioned on said inner surface of the pipe. Each of the first electrodes may have a width in a direction substantially perpendicular to the direction of flow of material within the pipe of at least 20% of a perimeter of the pipe.

By providing electrodes having a width which is at least 20% of the perimeter of the pipe, the signal-to-noise ratio in the monitored electrical parameters (and data derived therefrom) may be improved. This in turn improves the accuracy of the data indicative of a property of the material generated by the controller.

The plurality of electrodes may be, in use, associated with a lower surface of the pipe.

By providing the electrodes at a lower surface of the pipe, it is possible avoid detecting instabilities in the flow caused by disturbances which are typically found around the upper portion of material within the pipe. For example, where air bubbles are entrained within the material within the pipe these tend to be found towards the upper region within the pipe. Further, such entrained air bubbles may introduce measurement instabilities, and thus increase measurement noise. By providing the electrodes at a lower surface of the pipe, it is possible to perform measurements only on material in a lower portion of the pipe, and to therefore to avoid such an increase in noise.

The width of the at least one of the electrodes in a direction substantially perpendicular to the direction of flow of material within the pipe may be less than about 75% of a perimeter of the pipe.

Each of the first electrodes may have a width in a direction substantially perpendicular to the direction of flow of material within the pipe of less than about 75% of a perimeter of the pipe.

By providing first electrodes having a width below about 75% of the pipe perimeter, it is possible avoid detecting instabilities in the flow which may be known to occupy a particular region within the pipe. For example, where air bubbles are entrained within the material within the pipe these tend to be found towards the upper region within the pipe. Further, such entrained air bubbles may introduce measurement instabilities, and thus increase measurement noise. Thus, by providing the electrodes around less than around 75% (as opposed to around the entire pipe circumference), it is possible to sense primarily around only a predetermined portion of the pipe, and to therefore to avoid an increase in noise associated with a known disturbance which occurs within a particular region of the pipe. Of course, it will be appreciated that a disturbance may occur in different portions of a pipe. For example, rather than air bubbles, the disturbance may be a sediment which forms at the bottom of the pipe.

Preferably, the width of the electrodes along a direction substantially perpendicular to the direction of flow of material within the pipe is greater than about 40% of the perimeter of the pipe. It has been discovered that by maintaining the electrode width above about 40% of the perimeter an improved signal to noise ratio can be achieved.

Preferably, the width of the electrodes along a direction substantially perpendicular to the direction of flow of material within the pipe is less than around 60% of the perimeter of the pipe. It has been discovered that by maintaining the electrode width to below about 60% of the perimeter effects introduced by the presence of disturbances such as, for example, air bubbles can be reduced significantly.

Most preferably, the width of the electrodes along a direction substantially perpendicular to the direction of flow of material within the pipe is around a half of the perimeter of the pipe. It has been discovered that providing electrodes around about half of the perimeter of the pipe provides, in some embodiments, an optimal compromise between maximising signal acquisition area (and thus improved noise performance) and the risk of detecting entrained air bubbles (and thus reduced noise performance).

The measurement apparatus of any of the first to fifth aspects of the invention may comprise a pipe. In use, material may be caused to flow within the pipe. At least one of the electrodes may be associated with a surface of the pipe. The surface may be an inner surface of the pipe. At least one of the electrodes may be positioned on said inner surface of the pipe. Each of the electrodes may be positioned on said inner surface of the pipe.

According to a sixth aspect of the invention there is provided an industrial control system comprising a measurement apparatus according to any one of the first to fifth aspects of the invention. The industrial control system may be arranged to control a characteristic of an industrial process based upon said data indicative of a property of the material.

The industrial control system may be arranged to control the characteristic of the industrial process based upon a relationship between said data indicative of a property of the material and reference data indicative of a reference property of a material. The characteristic of the industrial process may be, for example, a characteristic affecting mixing of components of an industrially produced composition.

If said data indicative of a property of the material does not have a predetermined relationship with said reference data, the industrial control system may be arranged to modify the characteristic of the industrial process so as to cause the data indicative of the property of the material to approach said reference data (i.e. so as to cause the data to have values which more closely resemble the reference data).

The concept of causing the data indicative of the property of the material to approach said reference data may be understood as modifying said characteristic of the industrial process such that the data indicative of the property of the material better has the predetermined relationship with said reference data.

Alternatively, the concept of causing the data indicative of the property of the material to approach said reference data may be understood as modifying said characteristic of the industrial process such that the data indicative of the property of the material approaches or moves towards said reference data.

According to a further aspect of the invention there is provided a method of operating a measurement apparatus according to any one of the first to fifth aspects of the invention, or an industrial control system according to the sixth aspect of the invention.

Features described in relation to one aspect of the invention may be combined with any other aspects of the invention where appropriate.

BRIEF DESCRIPTION OF THE DRAWINGS

Embodiments of the invention will now be described, by way of example, with reference to the accompanying drawings in which:

FIG. 5 is a schematic illustration showing a characteristic determined by a process carried out by the apparatus of FIG. 1;

FIGS. 6a and 6b are schematic illustrations showing further alternative embodiments of the invention;

DETAILED DESCRIPTION

Figure 1:
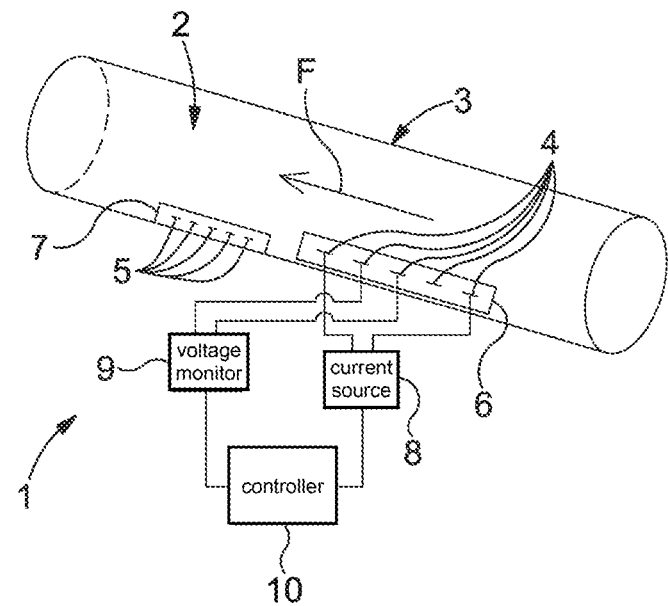
FIG. 1 is a schematic illustration of an apparatus according to an embodiment of the invention.

Referring to FIG. 1, a measurement apparatus 1 according to an embodiment of the invention is shown. The measurement apparatus 1 is a tomography apparatus, and is arranged to measure properties of a material 2 within a pipe 3 having a generally circular cross-section. The measurement apparatus 1 is arranged at an inner surface of the pipe 3. The material is flowing in a direction F.

The measurement apparatus 1 has a plurality of first electrodes 4, and a plurality of second electrodes 5. The plurality of first electrodes 4 are arranged along the inner surface of the pipe 3 forming a first linear array 6. The second electrodes 5 are arranged in a similar fashion to the first electrodes 4. That is, the second electrodes 5 are also arranged along the inner surface of the pipe 3 forming a second linear array 7.

The measurement apparatus 1 further comprises a current source 8, and a voltage monitor 9, which are switchably connected to each of the electrodes 4, 5. In the illustrated configuration the current source 8 is arranged to apply a current between two of the first electrodes 4, and the voltage monitor 9 is arranged to monitor a voltage between a different two of the first electrodes 4. The current source 8 and the voltage monitor 9 are both connected to, and controlled by, a controller 10.

Figure 2:
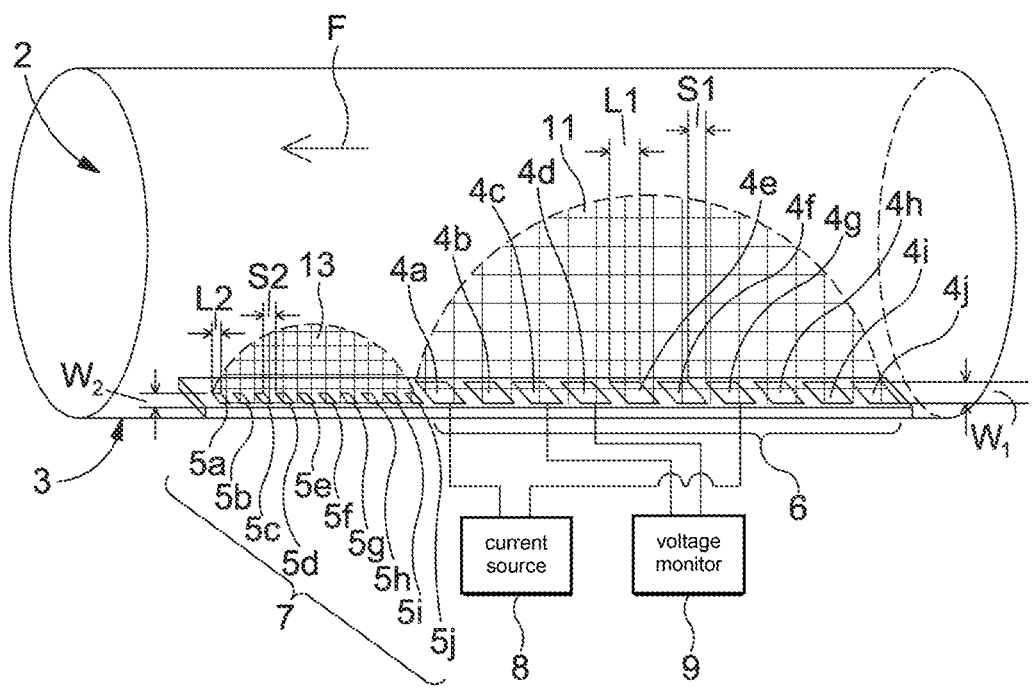
FIG. 2 is a schematic illustration of part of the apparatus of FIG. 1.

FIG. 2 shows the arrangement of the electrodes 4, 5 in more detail. Each of the first electrodes 4 is spaced apart by a predetermined spacing S1 along the direction in which the array 6 extends. Each of the first electrodes 4 has a length L1 along (i.e. axially) the direction in which the array 6 extends, and a width W1 perpendicular to the direction in which the array 6 extends (i.e. circumferentially).

Each of the second electrodes 5 is spaced apart by a predetermined spacing S2 along the direction in which the array 7 extends, and a length L2 along the direction in which the array 7 extends, and a width W2 perpendicular to the direction in which the array 7 extends. The spacing S2 of the second electrodes 5 is greater than the spacing S1 of the first electrodes 4.

The dimensions of each of the electrodes 4, 5 is selected to provide sufficient area to inject a required measurement current into the material 2, such that reliable measurements can be taken. A larger electrode will allow more current to be injected, but will suffer from reduced measurement resolution (as described in more detail below). Each of the electrodes 4, 5 is formed from a conductive material, allowing electrical contact to be made between the electrodes 4, 5 and the material 2 within the pipe 3. The electrodes may suitably be formed from a corrosion resistant material such as, for example, stainless steel. The electrodes may suitably be configured to allow for hygienic operation, for example in compliance with Clean-in-Place (CIP) and/or hygienic design practices such as those specified by the European Hygienic Engineering and Design Group (EHEDG).

As mentioned above, each of the electrodes 4, 5 is switchably connected to the current source 8 and the voltage monitor 9. In the arrangement of FIG. 2 the current source is arranged to apply a current between two of the first electrodes. That is, a circuit is formed by the current source 8, a first one of the electrodes 4, the material 2, and a second one of the electrodes 4. Current flows from the current source 8 into the material 2 via the first electrode 4, before returning to the current source 8, via the second electrode 4. The first and second electrodes, when connected to the current source, may be referred to as energisation electrodes. The current source may, for example, be arranged to supply an alternating current (AC) to the electrodes 4. The frequency of signals applied to the electrodes 4 is varied in dependence upon the material 2 within the pipe 3. The frequency may be varied based upon the conductivity and/or rheology of the material 2 of interest. For example, a higher frequency may be used for a material having a lower conductivity and/or higher viscosity. In some applications, an applied signal may have a frequency of as low as around 1 kHz. Further, in some applications, an applied signal may have a frequency of up to around 50 kHz.

Similarly, the amplitude of signals applied to the electrodes 4 is varied in dependence upon the material 2 within the pipe 3. For example, in some applications, an applied signal may have an amplitude of as low as around 0.1 mA. Further, in some applications, an applied signal may have an amplitude of up to around 75 mA.

It will be appreciated that the frequency and amplitude of applied signals may be optimised for each material and process combination, for example by experimentation or by reference to known properties of materials under test. For example, where a material under test is known to have a higher impedance to electrical signals an increased amplitude signal may be used. Further, the electrical impedance of a material will often vary based upon the excitation frequency. As such, the energisation frequency and amplitude may be selected so as to produce a detectable potential field distribution at the monitor electrodes.

Each of the electrodes 4 is also switchably connected to the voltage monitor 9. When connected to one of the electrodes 4 the voltage monitor is arranged to measure the electrical potential at that electrode. Each of the electrodes 4 is at substantially the same potential as the material adjacent to the respective one of the electrodes 4. Therefore, by measuring the electrical potential at the electrodes 4, the potential difference between different locations within the material 2 can be measured, as described in more detail below. The voltage monitor 9 may use synchronous techniques, such as, for example phase sensitive detection, to detect a signal having the same frequency as the current supplied by the current source 8. Such phase sensitive detection can provide enhanced noise immunity to wideband noise sources, by allowing detection only at the frequency supplied by the current source 8. The voltage monitor 9 may be configured to measure the magnitude of the signal received at the supply frequency. The voltage monitor 9 may also be configured to measure the phase angle of a measured signal with respect to the phase of any injected signal.

In the arrangement of FIG. 2, each of a pair of the remaining electrodes 4 are connected to the voltage monitor 9. In this arrangement, the voltage monitor 9 is able to measure the potential difference between the pair of electrodes 4, and thereby the potential difference between the regions of material 2 adjacent to the respective electrodes 4. The electrodes 4, when connected to the monitor, may be referred to as monitor electrodes. The current flow and potential difference distribution within the material 2 is described in more detail below.

Figure 3:
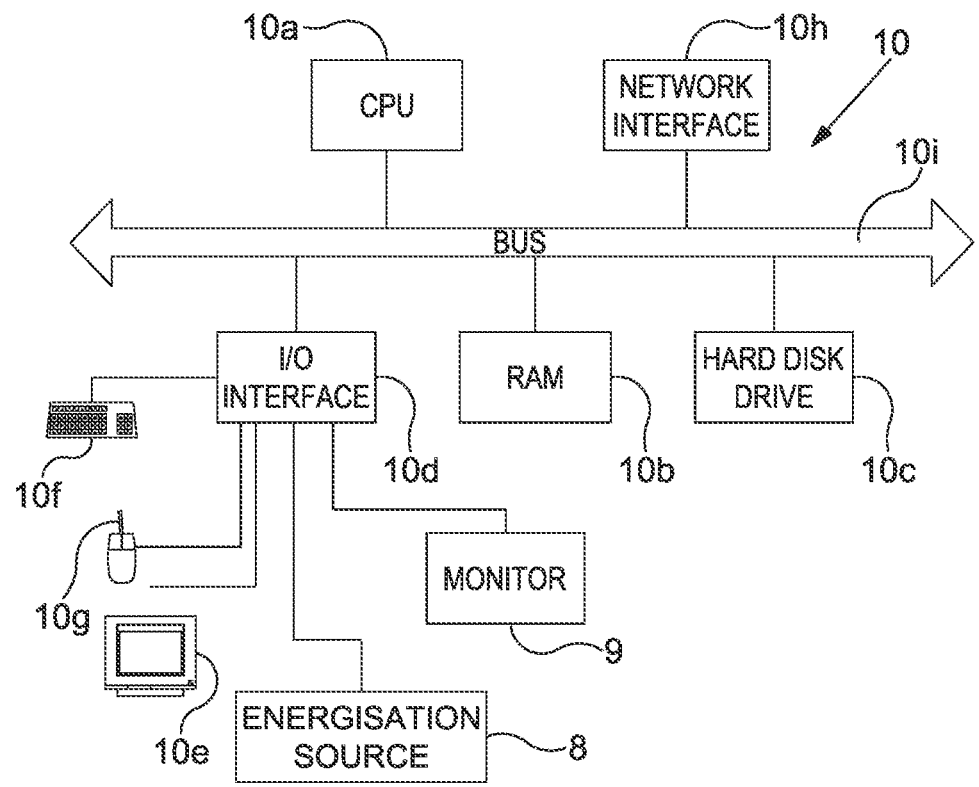
FIG. 3 is a schematic illustration of a controller which is part of the apparatus of FIG. 1.

FIG. 3 shows the controller 10 in further detail. It can be seen that the controller 10 comprises a CPU 10a which is configured to read and execute instructions stored in a volatile memory 10b which takes the form of a random access memory. The volatile memory 10b stores instructions for execution by the CPU 10a and data used by those instructions. For example, in use, measured voltage values may be stored in the volatile memory 10b.

The controller 10 further comprises non-volatile storage in the form of a solid state drive 10c. The measured voltage values and calculated resistivity values may be stored on the solid state drive 10c. The controller 10 further comprises an I/O interface 10d to which are connected peripheral devices used in connection with obtaining the measured signals. More particularly, a current source 8 and voltage monitor 9 are connected to the I/O interface 10d.

A network interface 10h allows the probe controller 10 to be connected to a computer network, so as to receive and transmit data from and to other computers in that network. The CPU 10a, volatile memory 10b, solid state drive 10c, I/O interface 10d, and network interface 10h, are connected together by a bus 10i.

In use, electrical resistance tomography (ERT) measurements are carried out using the measurement apparatus 1. The ERT measurements comprise injecting a predetermined current between selected ones of the electrodes 4, 5, and measuring the voltage between pairs of the electrodes 4, 5. One such measurement is described above with reference to the first and second electrodes 4 (energisation electrodes), and a pair of the remaining electrodes 4 (monitor electrodes). Once a first measurement is complete, and while the current is still being injected between the energisation electrodes, a potential difference is measured between different combinations of the remaining electrodes. A current is then injected between a different adjacent pair of the electrodes 4, and potential differences measured between pairs of the remaining electrodes 4.

ERT measurements are generally carried out using similar electrode energisation sequences to those typically used with circular arrays. For example, in an embodiment ERT measurements are performed using an eight element linear array (i.e. an array comprising eight measurement electrodes 4b-4i, and two earth electrodes 4a, 4j) with measurements performed in the sequence described below. Such a sequence of energisation may generally be referred to adjacent electrode energisation.

Current is first injected between electrodes 4i and 4b, and voltages measured between the pairs of electrodes 4c-4d, 4d-4e, 4e-4f, 4f-4g and 4g-4h.

Current is then injected between electrodes 4b and 4c, and voltages measured between each of the pairs of electrodes 4d-4e, 4e-4f, 4f-4g, 4g-4h and 4h-4i.

Current is then injected between electrodes 4c and 4d, and voltages measured between each of the pairs of electrodes 4e-4f, 4f-4g, 4g-4h and 4h-4i.

Current is then injected between electrodes 4d and 4e, and voltages measured between each of the pairs of electrodes 4f-4g, 4g-4h and 4h-4i.

Current is then injected between electrodes 4e and 4f, and voltages measured between each of the pairs of electrodes 4g-4h and 4h-4i.

Finally current is injected between electrodes 4f and 4g, and voltages measured between the electrodes 4h-4i.

It is noted that the first of the above described energisations is not 'adjacent', in that the electrodes 4b and 4i are disposed towards opposite ends of the array. However, providing such an energisation provides additional depth sensitivity into the body of the pipe 3, allowing the linear ERT sensor to have an increased field of view.

In general terms, the energisation process is continued until all combinations of adjacent electrode pairs have been energised, and for each energisation, all combinations of electrodes pairs have been subject to potential difference measurements. It will be appreciated, however, that some electrode combinations may be excluded from this measurement process, such as, for example, the reverse combination of measurements already taken. For example, where a first pair of electrodes has served as energisation electrodes, and a second pair of electrodes as monitor electrodes, there is no need to perform the reverse measurements (i.e. the second pair as energisation electrodes and the first pair as monitor electrodes).

The adjacent electrode energisation strategy described above is generally considered to provide high sensitivity in regions near to the electrodes, with reduced sensitivity distant from the electrodes.

Of course, while adjacent electrode energisations are described above other energisation protocols may instead be preferred, such as, for example, an opposite electrode energisation sequence. For example, current could be injected between electrode pairs which are separated from one another. In one example energisation sequence current would be first injected between electrodes 4b and 4f, and potentials measured between the pairs of electrodes 4c-4d, 4d-4e, 4g-4h and 4h-4i. Potentials may then also be measured between non-adjacent pairs of electrodes. Such an energisation sequence can be used to enhance the field distribution within the material 2, and improve far-field sensitivity. It is noted, however, that where non-adjacent electrode energisation strategies are used, the number of possible electrode energisation combinations is significantly increased, requiring a more extensive multiplexing system and more extensive subsequent processing of data than for adjacent electrode energisation strategies.

Moreover, different electrode energisation protocols or arrangements may be preferred for different applications or imaging requirements so as to optimise sensitivity to particular properties of interest.

For example, an energisation strategy may be used in which current is first injected between an outside pair of electrodes (e.g. electrodes 4b-4i), and potentials are measured between each other electrode pair between the injection electrodes (e.g. 4c-4d, 4d-4e, 4e-4f, 4f-4g, 4g-4h). Then, a next most outside pair is energised (e.g. electrodes 4c-4h), and potentials are measured between the remaining internal electrode pairs (e.g. 4d-4e, 4e-4f, 4f-4g) and so on. Such an energisation strategy may improve sensitivity within the centre of the pipe.

Further, alternative array arrangements may be used to improve sensitivity at the pipe wall or periphery. For example, a Wenner array comprising four equally spaced electrodes may be used. Current is generally injected between the two outer electrodes, while potential is measured between the two inner electrodes. Such an arrangement may provide high sensitivity to near surface inhomogeneity. However, such high sensitivity to near surface conditions may also result in distorted responses to electric fields which are established further from the surface. As such, a Wenner array may be used to enhance sensitivity at the pipe wall or periphery.

It will be appreciated that where electrode arrays having a larger (or smaller) number of electrodes than eight are used, the energisation strategies may be adapted accordingly.

The various energisations and measurements described above allow information relating to the resistivity of the material 2 to be determined. By injecting currents into the material 2, an electrical potential distribution is setup within the material 2. A gradual reduction in potential is developed along the current path between the two energisation electrodes 4, with current flowing from a higher potential to a lower potential. This potential distribution also extends throughout the region of material 2 surrounding the electrodes, resulting in observable potential differences at the electrodes 4. However, rather than being a uniform reduction in potential along the current path between the two energisation electrodes 4, the rate of change of potential in any given portion of the material 2 depends on the resistivity of the material 2 in that particular portion. As such, the observed potential differences are affected by the resistivity of the material 2. Furthermore, the length of the array 6, and selection of which of the electrodes 4 are energised and monitored within the array 6 results in an effective region of measurement, or field-of-view, which extends into the material 2 in the plane of the array 6.

In general terms, it will be appreciated that when a current is injected between immediately adjacent electrodes, such as, for example electrodes 4a, 4b, the electric field generated within the material is strongest between those two electrodes 4a, 4b. The electric field strength, and the resulting potential distribution, decays away into the remaining material 2 as the distance is increased from the surface of the electrodes 4. However, when current is injected from non-adjacent electrodes (e.g. electrodes 4a, 4d), the electric field generated extends further from the electrodes into the material. As such, by energising and monitoring different combinations of electrodes it is possible to gather information relating to material 2 which is not immediately adjacent to the electrodes 4.

Fluctuations in the resistivity of the material thus lead to corresponding fluctuations in the measured potential differences. Once each of the measurements described above has been carried out, the controller 10 processes the measured data, in combination with knowledge of the geometric relationships between the various electrodes 4 to generate a set of electrical resistivities which represent the distribution of potential throughout the material 2 within the region around the measurement electrodes 4. The generated set of electrical resistivities each corresponds to a sub-region within the material 2, with the complete set of electrical resistivities together forming a map of the electrical resistivities distribution within the material 2. The processing required to generate the set of electrical resistivities representative of the distribution of potential throughout the material 2 within the region around the measurement electrodes 4 will be known to one skilled in the art.

A process of excitation, measurement and processing as described above with reference to the first electrodes 4 is also carried out using the second electrodes 5. However, the spacing of the electrodes 5 being smaller than that of the first electrodes 4 results in the depth of material 2 from the second electrodes 5 which significantly influences the measurements being reduced accordingly. This can be understood with reference to FIG. 2.

The electric field established by the flow of current through the material 2 will extend infinitely far from the electrodes 4, 5. However, as the distance from the electrodes 4, 5 is increased, the strength of the field is gradually reduced, so as to eventually become negligible. As such, it is possible to define a field-of-view 10 which is a region surrounding the electrodes 4 in which the properties of the material 2 are considered to have a measurable influence on the flow of current between the various combinations of electrodes 4. The field-of-view 10 extends into the material 2 a first distance 11 which is related to the distance between the energisation electrodes within the first array 6.

Similarly, it is possible to define a field-of-view 12 which is a region surrounding the electrodes 5 in which the properties of the material 2 are considered to have a measurable influence on the flow of current between the various combinations of electrodes 5. The field-of-view 12 extends into the material 2 a second distance 13 which is related to the spacing of the electrodes 5 within the second array 7.

The number, dimensions, and spacing of each of the electrodes 4, 5 within the first and second arrays 6, 7, and hence the respective lengths of the arrays 6, 7, thus influence the respective distance 11, 13 which the regions 10, 12 extend into the material 2.

For example, the first array 6 comprising ten first electrodes 4 each having a length L1 of 1.8 mm, a spacing S1 of 1.8 mm has a total length of around 34.2 mm. Such an array may result in the region 10 having a first distance 11 of around 12.7 mm. That is, such an array would allow measurements to be made of material in the region extending up to 12.7 mm from the surface of the electrodes. The first electrodes may suitably have a width W1 of around 8 mm. The width W1 is selected to provide an electrode area which is suitable to inject the current required for the measurements described above. The width W1 does not itself directly affect the measurement resolution or field-of-view.

This can be contrasted with a second array 7 comprising 10 second electrodes 5 each having a length L1 of 0.4 mm, a spacing S1 of 0.4 mm, and having a total length of around 8 mm. Such an array may result in the region 10 having a first distance 11 of around 2.54 mm. That is, such an array would allow measurements to be made of material in the region extending up to 2.54 mm from the surface of the electrodes 5. The second electrodes may suitably have a width W2 of around 2.54 mm. The width W2 is selected to provide an electrode area which is suitable to inject the current required for the measurements described above. The width W2 does not itself directly affect the measurement resolution or field-of-view.

In addition to the reduction in size of the region which is measured by the second array 7 with respect to the first array 6, a corresponding increase in the measurement resolution is also achieved. As described above, the potential difference measurements taken are used to generate a two-dimensional map of the resistivity within the regions of measurement, each region being broken into a plurality of sub-regions. Allowing for a similar number of sub-regions within each region, the second array 7 allows for each sub-region within the region 13 to be approximately 5 times smaller than each of the sub-regions within the region 11.

The number of sub-regions may be varied based upon measurement conditions and geometry. In some embodiments four sub-regions may be provided within each region. The sub-regions may, for example, be distributed so as to extend in a direction parallel to the pipe wall, with each sub-region being associated with a particular nominal distance from the pipe wall (i.e. a nominal depth into the pipe). That is, as the distance is increased from the pipe wall towards the centre of the pipe in a direction normal to the surface of the pipe wall, several sub-regions may be traversed.

By using a first array 6 which allows measurements deep into the material 2 (albeit with a relatively low resolution), and a second array 7 which allows measurements with a high resolution (albeit with a relatively shallow depth) detailed information relating to the distribution of the material 2 within the pipe 3 can be determined. The first array 6 may be referred to as far-field array, which allows measurements deep into the material 2. Similarly, the second array 7 may be referred to as a near-field array, which allows detailed measurements to be taken of material immediately adjacent the array 7.

It will be appreciated that it is total length of an array which determines the depth of the field-of-view possible with that array. As such, an equivalent field-of-view may be established by two arrays having different electrode numbers and spacings, providing the total length of the arrays are equal.

Further, by suitable arrangement of the first and second arrays 6, 7 measurements taken by each of the arrays can be considered to represent substantially the same volume of material 2. That is, provided the separation between the first array 6, and the second array 7 is relatively small when compared to any changes in material flow conditions within the pipe (which may, for example, depend on the rate of flow, the turbulence of the flow, the viscosity of the material 2 among other things), a composite map of the resistivity of the material 2 within the pipe can be generated based on measurements taken by both of the arrays 6, 7. Such a composite map may have different resolutions in different regions.

For example, where the material 2 comprises a mixture of different material components, each of which may have a different (and known) resistivity, it may be possible to identify the proportions of each of these material components within the material 2 by further processing of the electrical resistivities generated as described above. That is, the resistivity value associated with each of the sub-regions can be converted to a volumetric fraction of each of the material components within that sub-region.

In this way, the processing described above can be used to determine the extent to which the different material components are mixed within the material as a function of location within the pipe 3. The improved resolution of resistivity data available due to the use of the second array 7 allows detailed information regarding the composition of the material at the edges of the pipe 3 to be determined.

Figure 4:
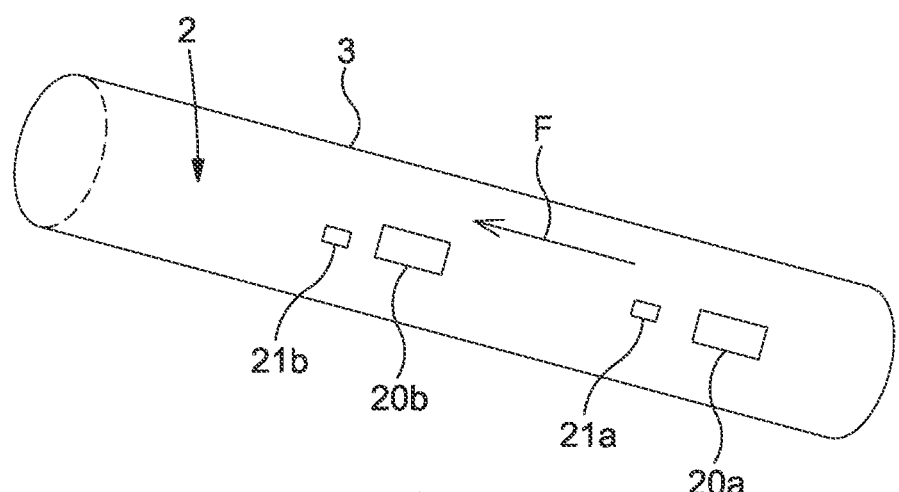
FIG. 4 is a schematic illustration showing an alternative embodiment of the invention.

In addition to the use of first and second arrays described above, additional first and second arrays of first and second electrodes 4, 5 may be provided. For example, as shown in FIG. 4, a pipe 3 is provided with two such first arrays 20a, 20b and two such second arrays 21a, 21b arranged as array pairs (i.e. 20a and 21a, 20b and 21b) disposed along the length of the pipe 3 and separated by predetermined interval. By conducting measurements as described above with each of the arrays 20a, 20b, 21a, 21b, it is possible to study the flow of the material 2 along the pipe 3.

It will of course be appreciated that in some embodiments the first arrays 20a, 20b, and second arrays 21a, 21b may be arranged in a different configuration. For example, the two first arrays 20a, 20b may be provided adjacent one another, and the two second arrays 21a, 21b may also be provided adjacent one another, rather than alternating as illustrated in FIG. 4.

For example, by performing a series of measurements with each of the arrays at different times, and then cross-correlating the results a measure of the speed of flow of the material 2 can be generated. Such repeated measurements and cross-correlation allows the velocity and velocity profile of the material 2 to be studied in some detail at the location of each of the arrays 20a, 20b, 21a, 21b.

By suitable arrangement of the pairs of first and second arrays, measurements taken by each of the arrays can be considered to represent substantially the same volume of material 2. Therefore, provided the separation between the first array 20a, and the corresponding second array 21a is small when compared to the separation between the first array 20a and the second array 20b, then each pair of array can be taken to represent a particular location along the pipe 3. It will further be appreciated that if there is uniform velocity within the material 2 between each of the arrays then similar measurements taken by each of the arrays will show corresponding resistivities (provided an appropriate time delay is applied).

However, if there are non-uniformities within the flow of material (which is highly likely) then there will be some change between measurements taken by each of the pairs of arrays. By analysis of these differences, information regarding the flow of material, and any changes in that flow can be extracted.

In particular, where the material 2 is flowing along the pipe 3 it may be found that there is a significant difference between the velocity of the material adjacent to the walls of the pipe, and that of the material within the centre of the pipe. Moreover, the rate of change of velocity as a function of distance from the pipe wall may well change significantly in the region adjacent to the walls of the pipe 3, and more gradually at the centre of the pipe 3.

Moreover, the velocity profile of material flowing within the pipe (obtained by the apparatus described above) can be used in some embodiments to determine rheology. For example, information relating to changes in velocity at different sub-regions within the pipe can be used to better understand the way in which the material flows and mixes within the pipe.

FIG. 5 illustrates an example of a velocity profile (in the y-axis) as a function of the distance from the wall of a pipe normalised by the pipe radius (in the x-axis). The velocity profile shown in FIG. 5 can be obtained by analysis of resistivity measurements obtained with the apparatus described above. It can be seen that the velocity at the pipe wall, in a region A of the graph, is significantly different from the velocity at the piper centre, in a region B of the graph. Further, an abrupt velocity change is seen in a region C of the graph between the regions A and B. That is, as the distance from the pipe wall increases, the velocity generally increases, with the rate of increase initially being low (in region A), the rate of increase rising significantly in region C, before the rate of increase reduces to approximately zero in region B. Further still, it can be seen that at the pipe wall (region D) the velocity has a finite value which is not zero. It will be appreciated, however, that due to interaction between the pipe wall and the material within the pipe, the velocity will likely fall to zero immediately adjacent to the pipe wall. As such, the use of the first and second arrays, each having different depth sensitivities can allow this region to be probed in more detail.

It has been described above that the degree of mixing within a material comprising a mixture of several material components can be studied by reference to variations of resistivity within the combined material. However, where a material is homogenous no such resistivity variation exists. In order to study the flow of such homogenous materials it is possible to introduce some form of tracer material having a different resistivity to the homogenous material so as to cause a disruption in the measured resistivities. The propagation of such a disruption can then be monitored as it progresses along the pipe 3, providing information regarding the relative velocity of different sub-regions within the material 2.

Alternatively, a thermal disturbance may be introduced to achieve the same purpose. For example, a heater (e.g. an induction heater) may be positioned within the pipe 3, allowing a small region of the material to be locally heated. Where the resistivity of the material changes as a result of the change in temperature, this change can be measured by the processing described above. The heated material will then be carried along the pipe 3, and a change in resistivity of the material can be monitored as it progresses along the pipe, providing information relating the relative velocity of different sub-regions within the material 2.

In an embodiment an apparatus may be used to monitor the mixing of a material within a mixing vessel. FIGS. 6a and 6b show a mixing vessel 30, having a mixing element 31 and containing a material 32 which is being mixed. The vessel 30 is provided with two first electrode arrays 33a, 33b and two second electrode arrays 34a, 34b which are provided round the inner surface of the vessel 30. In FIG. 6a, the electrode arrays are arranged to alternate between first and second electrode arrays in the direction of flow F. That is, the material 32 flows past the electrodes in the following sequence: first electrode array 33a, second electrode array 34a, first electrode array 33b, second electrode array 34b. In an alternative embodiment as shown in FIG. 6b, the electrodes arrays 33a, 33b, 34a, 34b, are rearranged such that the material 32 flows past the electrodes in the following sequence: first electrode array 33a, first electrode array 33b, second electrode array 34a, second electrode array 34b. It will be appreciated that other electrodes arrangements are possible. The following (and foregoing) description applies equally to the arrangements of FIGS. 6a and 6b.

Performing measurements as described above using each of the first and second arrays 33a, 33b, 34a, 34b allows information regarding the resistivity of the material 32 within the vessel 30 to be determined. This information is processed, as described above, to generate information relating to the velocity and mixing of the material 32 as required.

A disturbance device 35 is optionally provided on the inner wall of the mixing vessel 30, and is arranged to introduce a resistivity disturbance (e.g. a tracer, or a thermal disturbance) to allow velocity measurements within homogenous materials. The disturbance device 35 may inject material (e.g. a tracer element) into the mixing vessel which creates a conductivity contrast with the bulk material. It will be appreciated that any such tracer element should not contaminate the bulk material. In some embodiments the tracer element is a portion of the bulk material which has been heated or cooled. Where such a heated (or cooled) tracer element is used, the material is preferably heated (or cooled) enough so as to provide a conductivity contrast, while also not significantly distorting the rheological properties of the material. Rather than a heated (or cooled) tracer element, it may be possible to inject a different material having appreciably different conductivity characteristics than the bulk material.

By acquiring data from the electrodes arrays 33a 33b, 34a, 34b a measure of the resistivity at various predetermined sub-regions within the mixing vessel 30 can be derived. For example, the use of two similar electrode arrays 33a, 33b allows a similar measurement to be performed at a first location 36 (or sensing plane) and at a second location 37 (or sensing plane). Further, by performing repeated measurements at the first location 36 and the second location 36, and by comparing the results, it is possible to monitor the movement of a portion of material within the vessel 30. It will be appreciated that, as described above, data obtained from the arrays 33a, 34a can be combined to provide information relating to resistivity at a range of depths in the first location 36. Similarly, data obtained from the arrays 33b, 34b can be combined to provide information relating to resistivity at a range of depths in the second location 37.

Figure 7A:
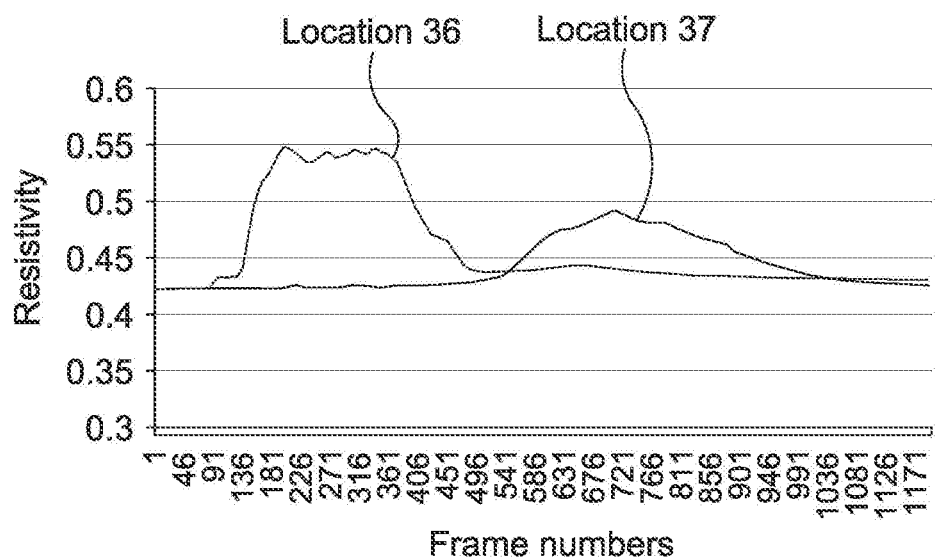
FIGS. 7a and 7b are plots of a characteristic of material at two locations within the apparatus of FIG. 6b at various times.

FIG. 7a shows an example of data acquired form electrode arrays 33a, 33b, 34a, 34b disposed around the inner surface of a mixing vessel 30. The material 32 within the vessel 30 is washing up liquid. During mixing a tracer element is injected by disturbance device 35. For example the tracer element may be a liquid having higher resistivity than the bulk material within the mixing vessel. The tracer element may be a portion of the bulk material which is heated. The x-axis represents measurement frame (increasing numbers indicate increasing time) while the y-axis represents a measure of resistivity at the first or second location 36, 37.

It can be seen that, at the first location 36, the resistivity rises at around frame 136 from a baseline value of about 0.42 to a peak value of around 0.55, with the peak being centred at around frame 271. The resistivity then falls back to approximately the baseline value after around frame 451.

It can also be seen that, at the second location 37, the resistivity rises at around frame 541 from a baseline value of about 0.43 to a peak value of around 0.49, with the peak being centred at around frame 721. The resistivity then falls back to approximately the baseline value after around frame 991.

By comparing the above described variations in resistivity at the first and second locations 36, 37, it can be understood that at least a portion of the tracer element, which is responsible for the increase in resistivity, has moved from the first location to the second location. Moreover, given the reduced amplitude of the increase in resistivity between the first and second locations 36, 37, and the increase duration for which the increase in resistivity can be observed at the second location 37 when compared to the first location 36, it can be concluded that the tracer element has been somewhat dispersed whilst the general region of material into which it was injected advances between the first and second locations 36, 37. For example, where material closer to the wall of the mixing vessel 30 moves more slowly than towards the centre of the vessel 30, it will be understood that an initially localised portion of injected tracer material may become de-localised.

Figure 7B:
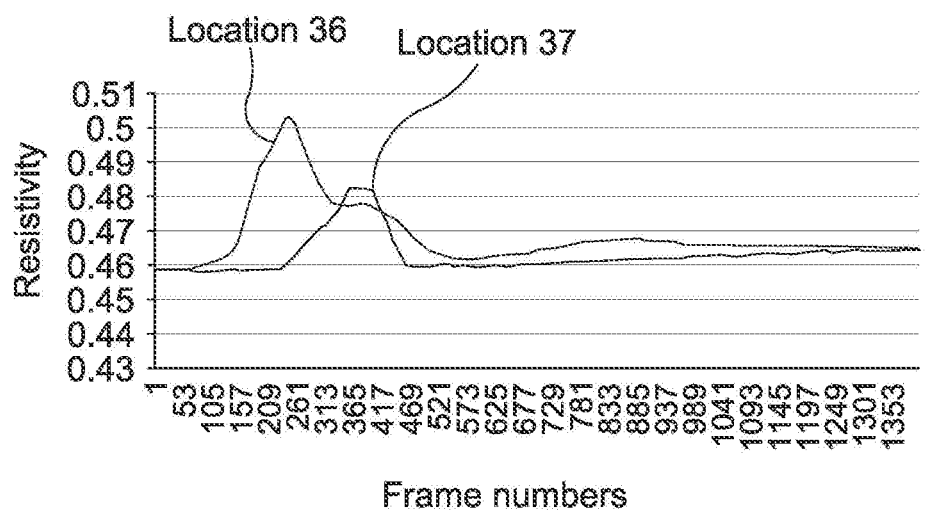

FIG. 7b shows a further example of data acquired form electrode arrays 33a, 33b, 34a, 34b disposed around the inner surface of a mixing vessel 30. The material 32 within the vessel 30 is a Newtonian fluid. During mixing a tracer element is injected by disturbance device 35. The tracer element may, for example, be a liquid having higher resistivity than the bulk material within the mixing vessel. The x-axis represents measurement frame (increasing numbers indicate increasing time) while the y-axis represents a measure of resistivity at the first or second location 36, 37.

It can be seen that, at the first location 36, the resistivity rises at around frame 157 from a baseline value of about 0.46 to a peak value of around 0.5, with the peak being centred at around frame 261. The resistivity then falls back to approximately the baseline value after around frame 521.

It can also be seen that, at the second location 37, the resistivity rises at around frame 261 from a baseline value of about 0.46 to a peak value of around 0.485, with the peak being centred at around frame 365. The resistivity then falls back to approximately the baseline value after around frame 469.

By comparing these variations in resistivity at the first and second locations 36, 37, it can be understood that the tracer element, which is responsible for the increase in resistivity, has moved from the first location to the second location. Moreover, given the reduced amplitude of the increase in resistivity between the first and second locations 36, 37, it can be concluded that the tracer element has been somewhat dispersed as the general region of material into which it was injected advanced between the first and second locations 36, 37. It is noted that the duration for which the increase in resistivity persists is greater at the first location 36 than the second location 37. This may, for example be evidence of at least a portion of the tracer material remaining at the first location and not being effectively transported by the mixing element 31. Such information can provide useful process information.

As described above with reference to FIGS. 7a and 7b, information regarding the rheology of the material 30 can be determined from resistivity measurements obtained from the electrodes arrays 33a, 33b, 34a, 34b.

While it is described above that each of the embodiments comprises at least one first array and one second array, in some embodiments two first arrays (or two second arrays) are sufficient to perform useful measurements. For example, where detailed information is required only relating to the bulk material (i.e. within the body of the pipe or vessel) or the boundary layers of material (i.e. at the walls of the pipe or vessel), cross-correlation techniques can be applied to measurements taken with the two first arrays (or two second arrays) and a velocity profile generated.

The use of cross-correlation techniques can be applied to measurements taken at physically separated locations so as to determine a difference therebetween. Such techniques, when applied to conventional circular ERT sensors (which provide sensing in a plane perpendicular to a direction of flow), allow a velocity profile of the flowing material to be determined.

However, the application of such cross-correlation techniques to data obtained by use of linear ERT sensors (as described above), in which the sensing plane is substantially parallel to a direction of flow, provides additional sensitivity. Moreover, the use of such techniques with linear ERT sensors having different depth sensitivities allows velocity information at different depths within the pipe to be measured. Further still, that the sensing plane is substantially parallel to a direction of flow allows auto-correlation of data obtained from a single ERT sensor to be used to determine flow rate. That is, by using a plurality of electrodes which are distributed along the direction of flow of a material (whether in a single array, or a plurality of arrays), and by taking measurements at a plurality different points in time, it is possible to derive information indicative of the rate of movement of the material adjacent to the sensor. It will be appreciated that such sensing has particular application in pipes where flow is known to have a uniform flow rate for any given radial position.

Figure 8:
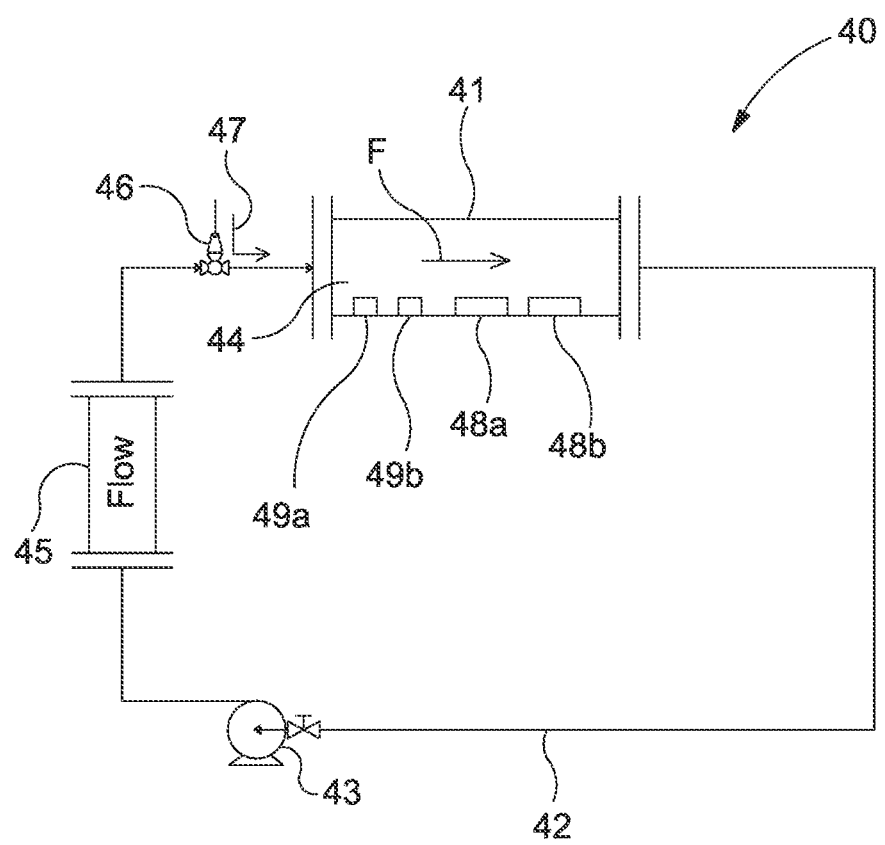
FIG. 8 is a schematic illustration showing a further alternative embodiment of the invention in a flow loop.

FIG. 8 shows a test apparatus 40 used to gather experimental data which is described in more detail below. The apparatus 40 comprises a sensor 41 (which is similar to that described above with reference to FIG. 4), a series of pipes 42, and a pump 43. The sensor 41, pipes 42 and pump 43 are arranged as a flow loop, allowing a material 44 within the pipes to be circulated in a direction F under controlled flow conditions. The apparatus 40 further comprises a mass flow sensor 45 which is arranged to provide an independent measurement of the average mass flow rate within the flow loop. The apparatus 40 further comprises a disturbance injection portion 46. The sensor 41, mass flow sensor 45 and disturbance injection portion 46 are each connected to and controlled by a controller (not shown) which may operate as described above with reference to the controller 10.

The flow loop simply provides a convenient test apparatus to allow the flow of the material 44 to be studied by the sensor 41, with the mass flow sensor 45 providing an independent measurement of the average mass flow rate for calibration and validation purposes. However, it will be appreciated that such a sensor 41 may be deployed in any number of industrial processing environments where a material is caused to flow within pipes. That is, while the illustrated flow loop is a closed system, there is no requirement that this is the case. Moreover, the mass flow sensor 45 may be omitted in industrial processing environments. It will be appreciated that, in use, a sensor 41 may be used to determine properties of any material which is conveyed within a pipe.

The disturbance injection portion 46 allows a resistivity disturbance (e.g. a tracer, or a thermal disturbance) to be created, allowing velocity measurements to be made within an otherwise homogenous materials. The disturbance injection portion 46 is arranged to inject a tracer element (e.g. heated material) into the flow loop upstream of the sensor 41 as shown by arrow 47.

The sensor 41 comprises a portion of pipe within the flow loop and is configured to have two first linear arrays 48a, 48b, and two second linear arrays 49a, 49b. The first and second arrays 48a, 48b and 49a, 49b are generally as described above with reference to arrays 6 and 7. Each of the pairs of arrays 48a, 48b and 49a, 49b comprises an upstream array 48a, 49a, and a downstream array 48b, 49b provided at the side wall of the sensor 41. A current source (not shown) and voltage monitor (also not shown) are both connected to and controlled by the controller and are arranged to control and monitor energisations of the arrays 48a, 48b, 49a, 49b. Measurements are performed with the arrays 48a, 48b, 49a, 49b as described above with reference to FIGS. 1 and 2.

The first arrays 48a, 48b may be referred to as far-field arrays, and may together be referred to as a far field sensor 48. Similarly, the second arrays 49a, 49b may be referred to as near-field arrays, and may together be referred to as a near field sensor 49.

In some embodiments, the separation between the two first linear arrays 48a, 48b is suitably 45 mm. The first linear arrays 48a, 48b may be approximately 35 mm in length. The separation between the two the second linear arrays 49a, 49b is suitably 18 mm. The second linear arrays 49a, 49b may be approximately 8 mm in length. The diameter of the sensor 41 is suitably 25.4 mm. The effective field of view of the first linear arrays 48a, 48b may, for example, be 12 mm from the wall of the sensor 41 (i.e. from the surface of the arrays 48a, 48b). The effective field of view of the second linear arrays 49a, 49b may, for example, be 3 mm from the wall of the sensor 41 (i.e. from the surface of the arrays 49a, 49b).

The sensor 41 may be configured to collect data at a frame rate of e.g. 1275 frames per second. In some embodiments, the sensor 41 may be configured to collect data at a frame rate of e.g. 630 frames per second with each frame being based upon an average of two samples.

Of course, it will be appreciated that different sensor and electrode geometries, and data collection rates, will be appropriate in different conditions, and for use with different materials.

The pipes 42 may have a diameter different to the sensor 41. For example, the pipes 42 may have a diameter of 38.1 mm. Where appropriate, diameter adjustment connectors may be used to connect pipes of different diameters to each other or to the sensor 41 or disturbance injection portion 46.

Figure 9A:
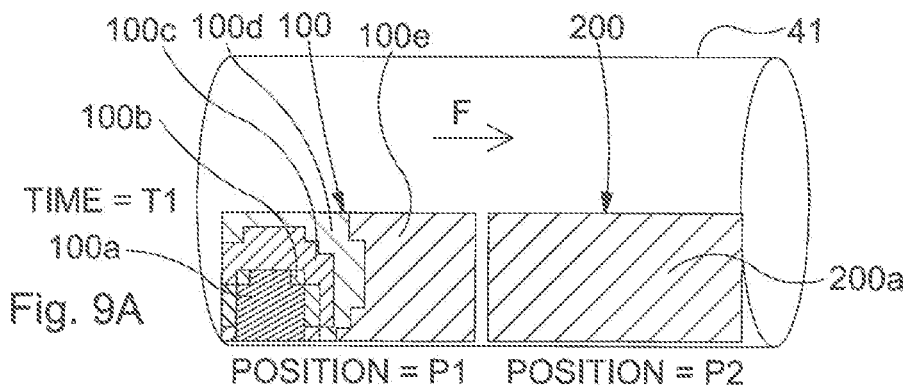
FIGS. 9a and 9b are plots showing a characteristic determined by a process carried out by the apparatus of FIG. 8.
Figure 9B:
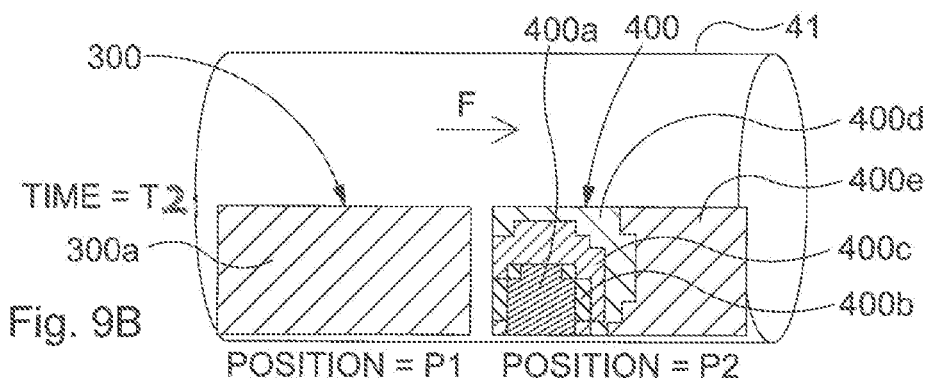

In general terms, it will be appreciated that by collecting data from the two pairs of arrays 48a, 48b and 49a, 49b at a plurality of times it is possible to observe changes in the distribution of the resistivity of the material in regions adjacent to the respective arrays at the respective plurality of times. FIGS. 9a and 9b illustrate data collected by such an arrangement. For example, using the arrays 48a, 48b and 49a, 49b at positions P1 and P2 respectively resistivity data is collected during a first time period T1 as described above, and a resistivity plot generated. FIG. 9a illustrates resistivity plots based upon data gathered during the time period T1 by the arrays 48a, 48b and 49a, 49b at positions P1 and P2. As described above, it will be appreciated that it is not necessary for both near field and far field sensors 48, 49 to be used to generate such data, but simply that data can be gathered relating to each of the regions P1 and P2.

Then, during a second time period T2, after the first time period T1, resistivity data is again collected using the arrays 48a, 48b and 49a, 49b at positions P1 and P2. Resistivity plots are again generated for both positions P1 and P2 based upon the collected data. FIG. 9b illustrates resistivity plots based upon data gathered at the time T2 by the arrays 48a, 48b and 49a, 49b at positions P1 and P2.

It can be seen at position P1 in FIG. 9a that there is a characteristic distribution of resistivity which corresponds to a localised pulse of material having a different resistivity at time T1. That is, a resistivity map 100 shows a non-uniform resistivity distribution with higher density hatching representing higher resistivity. In a first region 100a towards to lower left corner of the map 100, a generally circular region of highest resistivity is present. This is surrounded by regions 100b, 100c, 100d which have gradually lower resistivity. The remainder of the map 100 comprises a region 100e, having the lowest resistivity. On the other hand, as can be seen at position P2 in FIG. 9a there are no features present, indicating a generally uniform resistivity within the material at the position P2 at time T1. That is, a resistivity map 200 shows a uniform resistivity distribution in which a single region 200a of constant density hatching represents constant resistivity. The pulse observed at position P1 may, for example, be created by injection of lower or higher resistivity material (e.g. a portion of material which has been heated) upstream of the positions P1 and P2.

Considering FIG. 9b, the situation is reversed. That is, as can be seen at position P1 in FIG. 9b there are no features present, indicating a generally uniform resistivity within the material at the position P1 at time T2. That is, a resistivity map 300 shows a uniform resistivity distribution in which a single region 300a of constant density hatching represents constant resistivity. On the other hand, as can be seen at position P2 in FIG. 9b, there is a characteristic distribution of resistivity which corresponds to a localised pulse of material having a different resistivity at the position P2 at time T2. That is, a resistivity map 400 shows a non-uniform resistivity distribution with higher density hatching representing higher resistivity. In a first region 400a towards to lower left corner of the map 400, a generally circular region of highest resistivity is present.

This is surrounded by regions 400b, 400c, 400d which have gradually lower resistivity. The remainder of the map 400 comprises a region 400e, having the lowest resistivity. Moreover, the characteristic distribution of resistivity which corresponds to the localised pulse of material has a similar form in regions 100 and 400. That is, the material at position P1 at time T1 has moved to be at position P2 at time T2.

Moreover, with knowledge of the physical separation between positions P1 and P2, and the temporal separation between T1 and T2 it is possible to calculate the flow rate of the material. Moreover, by using cross-correlation techniques, it is possible to map different flow rates within the sub-regions of the resistivity maps 100, 200, 300, 400, or, when considering the physical system, it is possible to map different flow rates within the sub-regions of the pipe.

Figure 10A:
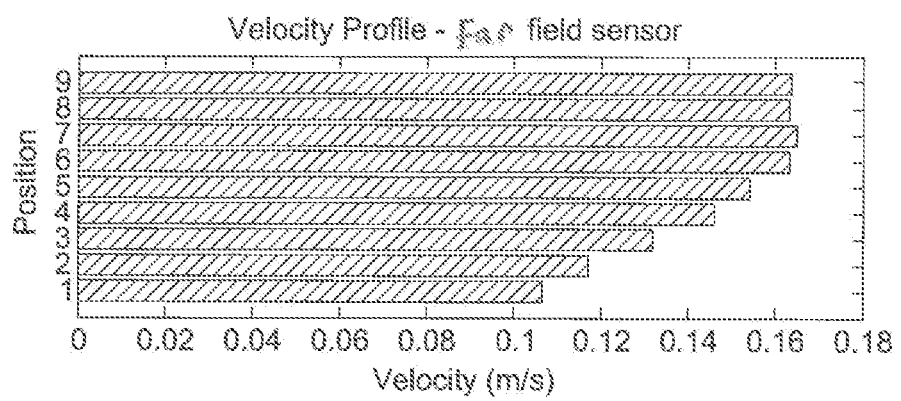
FIGS. 10a and 10b are plots showing a property derived from the data shown in FIGS. 9a and 9b.
Figure 10B:
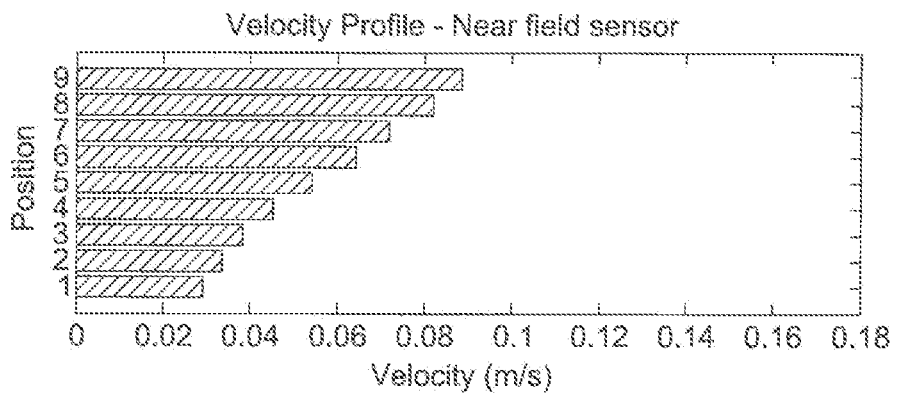

FIGS. 10a and 10b shows examples of calculated flow rates at various positions within the pipe based upon the data illustrated in FIGS. 9a and 9b. In both FIGS. 10a and 10b it can be seen that there is a flow rate (x-axis) associated with a number of positions (y-axis) within the pipe. Each of the positons in the y-axis corresponds to a vertical position in each of the FIGS. 9a and 9b. It will be appreciated that by processing of the data associated with the various resistivity maps shown in FIGS. 9a and 9b it is possible to generate data indicative of the velocity of material flowing within the pipe at various positions, and at various times.

In particular, FIG. 10a shows data calculated based upon the output of the electrode arrays 48a, 48b—that is far field data or material within the centre of the pipe (i.e. far from the arrays 48a, 48b). FIG. 10b, on the other hand, shows data calculated based upon the output of the electrode arrays 49a, 49b—that is near field data or material adjacent the wall of the pipe. If can be seen from FIGS. 10a and 10b that the flow rate (velocity) gradually increases as the distance from the pipe wall increases.

Figure 11:
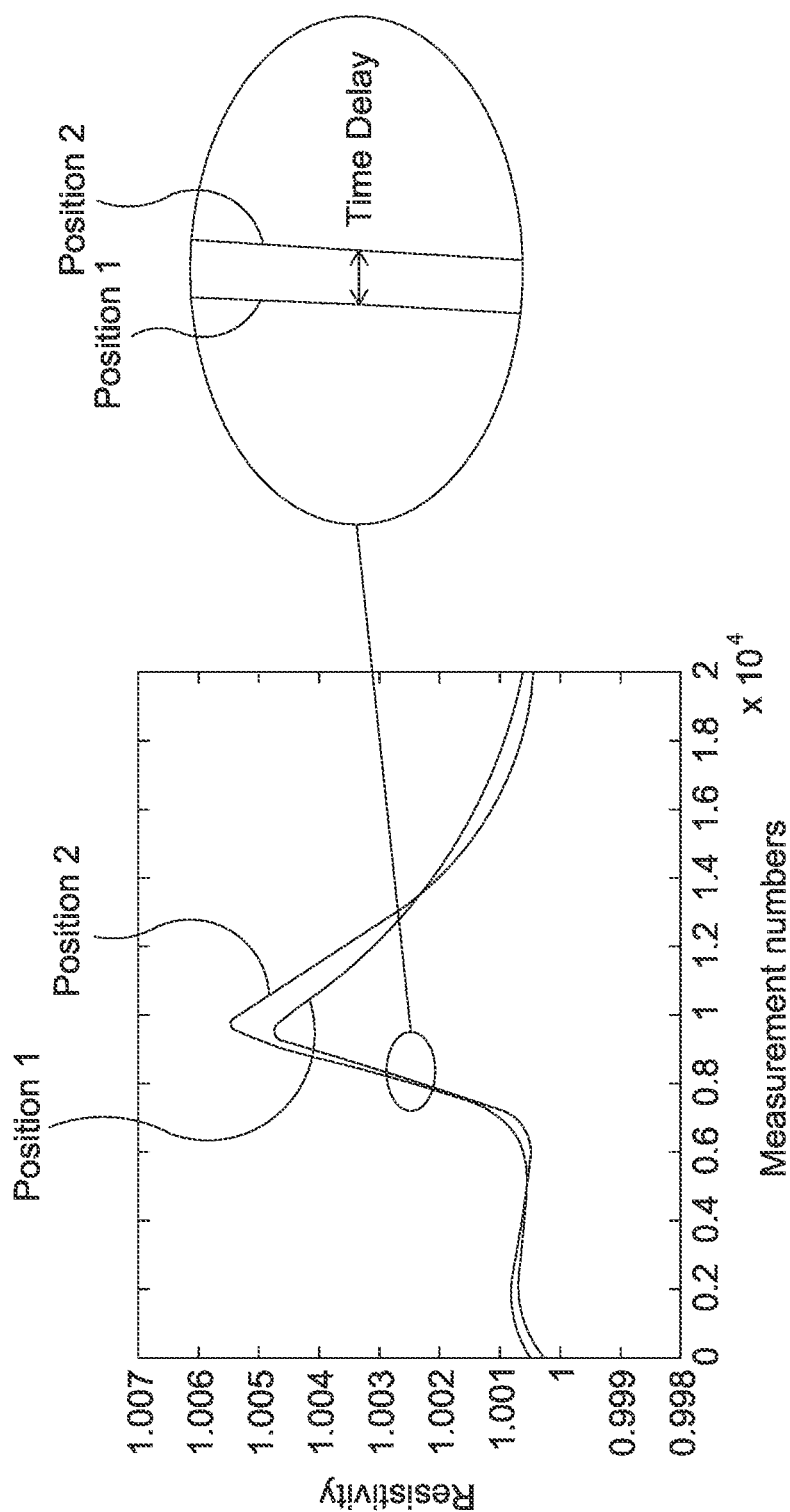
FIG. 11 is a plot of a characteristic of material at two locations within the apparatus of FIG. 8 at various times.

FIG. 11 shows an exemplary plot of the measured resistivity of material (y-axis) in a particular sub-region within the pipe (e.g. at a predetermined distance from the pipe wall) as measured at different locations (e.g. P1 and P2) across an extended duration. The x-axis represents time, with data relating to 20000 readings illustrated within the plot. The resistivity values are normalised to 1 to show relative changes. It can be seen that for data collected in both locations that there is a pulse in resistivity at around time 10000, which then decays away. However, as can be seen more clearly in the inset figure, there is an appreciable time delay between the pulses. That time delay represents the time take for material in the particular sub-region of the pipe to travel from the first location P1 to the second location P2.

As described above with reference to FIGS. 7a and 7b, by considering the time delay, and any change in pulse shape, it is possible to generate data indicative of the speed of material flowing at various sub-regions within the sensor 41.

In general terms, material flowing within a pipe or within a region of interest (e.g. a mixing vessel) may ordinarily exhibit a particular and repeatable flow distribution. As such, it may be possible to generate a model flow distribution which represents the flow. Moreover, it may be possible to compare data relating to flow velocity derived from resistivity measurements (as described above) to a model flow distribution to determine various characteristics of a material or the material flow. The model flow distribution may be referred to as reference data.

For example, a model flow distribution may be generated based upon measured flow of a known material under known flow conditions. Such a model flow distribution may be considered to represent optimum flow conditions, or material properties. As such, any deviation from that model flow distribution may be considered to be evidence of deviation from optimum flow conditions or material properties, and remedial action taken (or at least investigative action).

Such an approach may allow resistivity data which relates to a wide variety of materials (which may or may not be Newtonian material) to be used to monitor and control flow conditions. That is, the use of a model flow distribution does not necessarily require that the material obeys a known physical model. Rather, the model flow distribution may be based upon empirically determined data, or may simply be based upon data which is known to represent a desirable (or even undesirable) flow condition.

On the other hand, where a material does obey a known physical model, this may be used to generate a model flow distribution. For example, a Newtonian fluid flowing within a pipe with circular cross-section in single-phase laminar flow conditions is known to exhibit behaviour consistent with the Poiseuille equation (1):

$$v = \frac{1}{4\eta} \cdot \frac{dP}{dL} \cdot [R^2 - r^2], \qquad (1)$$

where:
v is the local material velocity,
dP/dL is the rate of change of pressure along the length of pipe,
R is the pipe radius,
r is the distance from the central axis of the pipe, and
η is the dynamic fluid viscosity.

Further, where the velocity distribution of material flowing within a pipe is known, an average of effective velocity $v_{eff}$ can be obtained by rearranging equation (1) as shown below. For example, if it is assumed that the effective average velocity $v_{eff}$ is equal to half of the maximum velocity (i.e. the velocity at the centre of the pipe), the dynamic fluid viscosity η can be obtained by the following relationship:

$$\eta = \frac{1}{8 v_{eff}} \cdot \frac{dP \cdot R^2}{dL}, \qquad (2)$$

That is, where a flow distribution is known to be single phase laminar flow, knowledge of the average velocity can be used to obtain an estimate of the dynamic fluid viscosity. It will be appreciated that such information may be relevant for controlling material process conditions. For example, where data is obtained indicating that a material viscosity is too low (i.e. the material is too thin) it may be possible to modify a processing condition so as to increase the viscosity. Conversely, where data is obtained indicating that a material viscosity is too high (i.e. the material is too thick) it may be possible to modify a processing condition so as to reduce the viscosity.

It will be appreciated that the above equations are applicable for single-phase laminar flow in Newtonian fluids only. Where non-Newtonian fluids are used, alternative models may be required.

Further where a flow distribution model is used (whether empirically determined or physically modelled) it is possible to fit the model to measured data points. Such processing allows characteristics of the model to be used to generate data relating to the material flow, even when direct measurements are not available.

For example, where velocity data is available at several locations within a pipe, it may be possible to reconstruct a full flow model, and to estimate volumetric flow rate based upon a small number of data points. For example, where a particular type of flow distribution is observed it may be possible to scale a model to fit measured data.

Similarly, where a particular flow distribution is desirable (e.g. laminar flow) it may be possible to determine whether laminar flow is present by making a relatively small number of measurements so as to determine whether the measured data points conform the model.

More generally, by generating a relationship between measured flow data and reference data it is possible to determine information regarding the flow (e.g. whether or not the flow is laminar, or whether the material viscosity meets a predetermined criterion). Further, while examples given above relate to Newtonian fluids, the techniques described herein are generally applicable to both Newtonian and non-Newtonian fluids.

Moreover, while in some cases it may be possible to determine information relating to the rheology of a material (e.g. viscosity) which can be verified by independent measurements, the techniques described herein are generally intended to provide rheological parameters which provide indicative information, rather than exact values. That is, experimental data obtained as described herein may be of particular use in detecting changes within a flow regime, or in providing a comparison between flow conditions during different time periods, rather than providing an exact measurement of a particular material property or flow characteristic (e.g. viscosity). For example, an obtained rheological parameter may be considered to represent an effective viscosity (i.e. the obtained rheological parameter being indicative of viscosity, rather than being equal to viscosity).

As described above for Newtonian fluids, a flow velocity profile can be fitted to a model (such as that described by equation (1)), allowing rheological parameters to be obtained. However, whereas a Newtonian fluid may have a single viscosity value, the viscosity of a non-Newtonian fluid will vary with stress and flow rate. As such, rather than fitting a single flow velocity profile to a model, several flow velocity profiles may be obtained for different bulk flow rates, and the obtained data used to derive a measure of rheology.

As described above, the apparatus 40 is used to gather experimental data, some of which is now described in more detail. The material 44 used for test purposes has a density of 1.03 kg/litre, a conductivity of 30 mS/cm and a viscosity of 6 Pa·s (6000 centipoise) at a temperature of 30° C. The pump 43 is controlled to operate at speeds of 30, 40 or 40 revolutions per minute, which correspond to average material flow speeds of 0.1 m/s, 0.15 m/s and 0.18 m/s respectively, as determined by the mass flow sensor 45. The disturbance injection portion 46 is arranged to inject 10 ml of heated material into the flow loop upstream of the sensor 41 as shown by arrow 47.

As described above, the sensor 41 is configured to collect data at a frame rate of e.g. 1275 frames per second. The following experimental results are generated based upon a current signal being injected into the electrodes having a frequency of 10 kHz, and a peak-peak amplitude of 10 V.

Figure 12A:
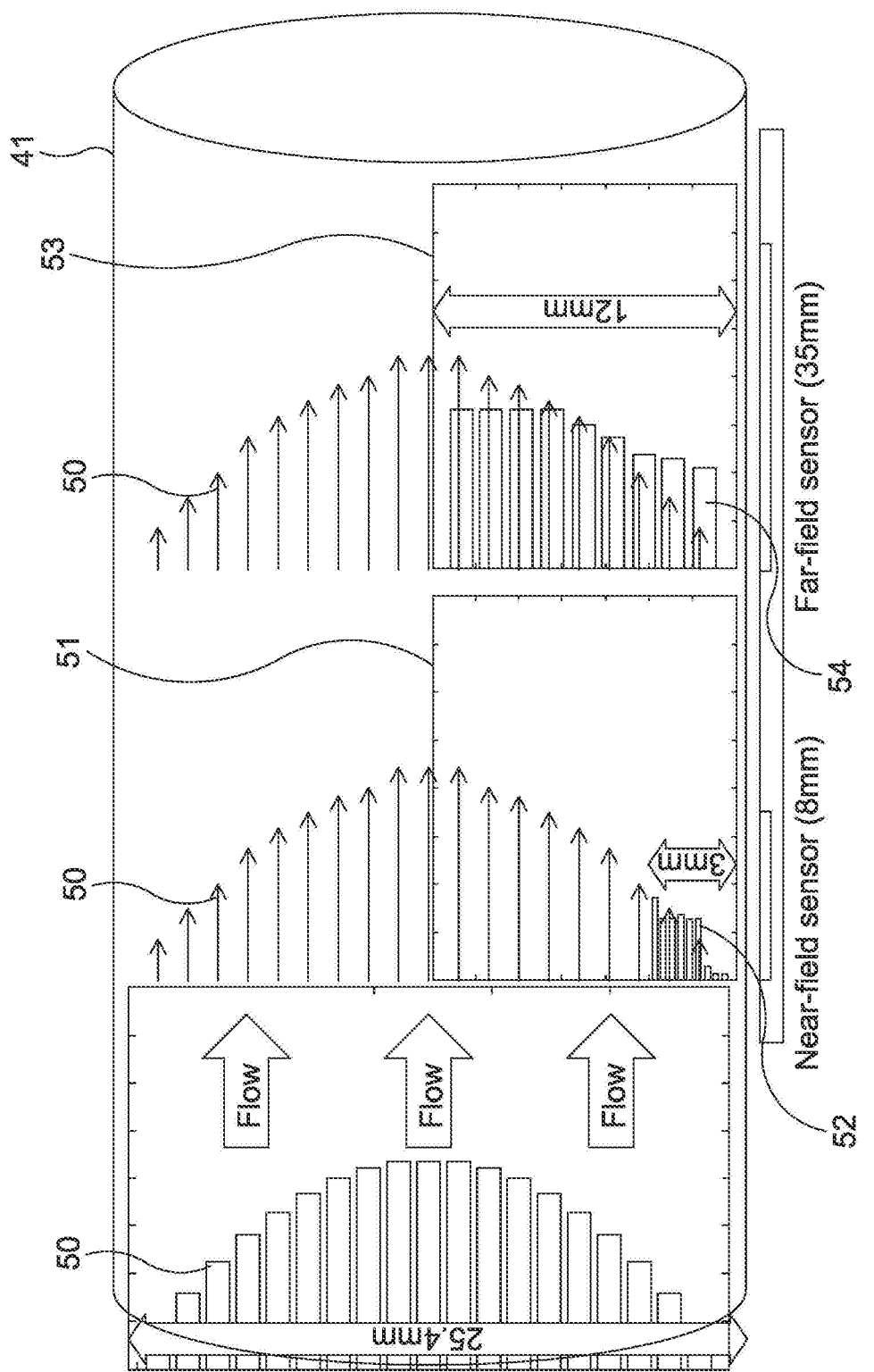
FIGS. 12a to 12c are schematic illustrations showing velocity profiles of material within the apparatus of FIG. 8 under different flow conditions.

FIG. 12a illustrates flow speed data generated based upon resistivity data collected by the sensor 41 at a first flow condition from both of the first and second arrays 48a, 48b, 49a, 49b. The flow of material was controlled to have an average flow rate of 0.1 m/s, with the pump 43 operated at 30 rpm, providing a mass flow rate of 200 kg/hr. The data illustrated is an average of five tests performed using the same flow conditions.

A model laminar flow distribution 50 is shown in which with each of the bars showing the flow velocity at a vertical location within the sensor 41.

Region 51 illustrates data derived from the near field sensor 49 (i.e. the arrays 49a, 49b) and comprises data bars 52 each of which shows the flow velocity (x-axis) at various positions (y-axis) within the sensor 41 in the region adjacent the wall (i.e. in the near-field).

Region 53 illustrates data derived from the far field sensor 48 (i.e. the arrays 48a, 48b) and comprises data bars 54 each of which shows the flow velocity (x-axis) at various positions (y-axis) within the sensor 41 towards the centre of the pipe (i.e. in the far-field).

It can be seen that the first arrays 48a, 48b (i.e. far-field sensor 48) provide information regarding the flow rate at a greater depth into the sensor 41 than the second arrays 49a, 49b (i.e. near-field sensor 49).

The flow distribution 50 represents a model laminar flow distribution within the sensor 41, which can be scaled so as to fit to the data bars 52, 54 obtained from the near-field and far-field sensors respectively 49, 48. It can be seen that in the model laminar flow distribution 50 the flow rate is fastest at the centre of the sensor 41, and slowest at the side walls. Moreover, it can be seen that the data bars 52, 54 generally fit to the scaled model distribution 50.

Figure 12B:
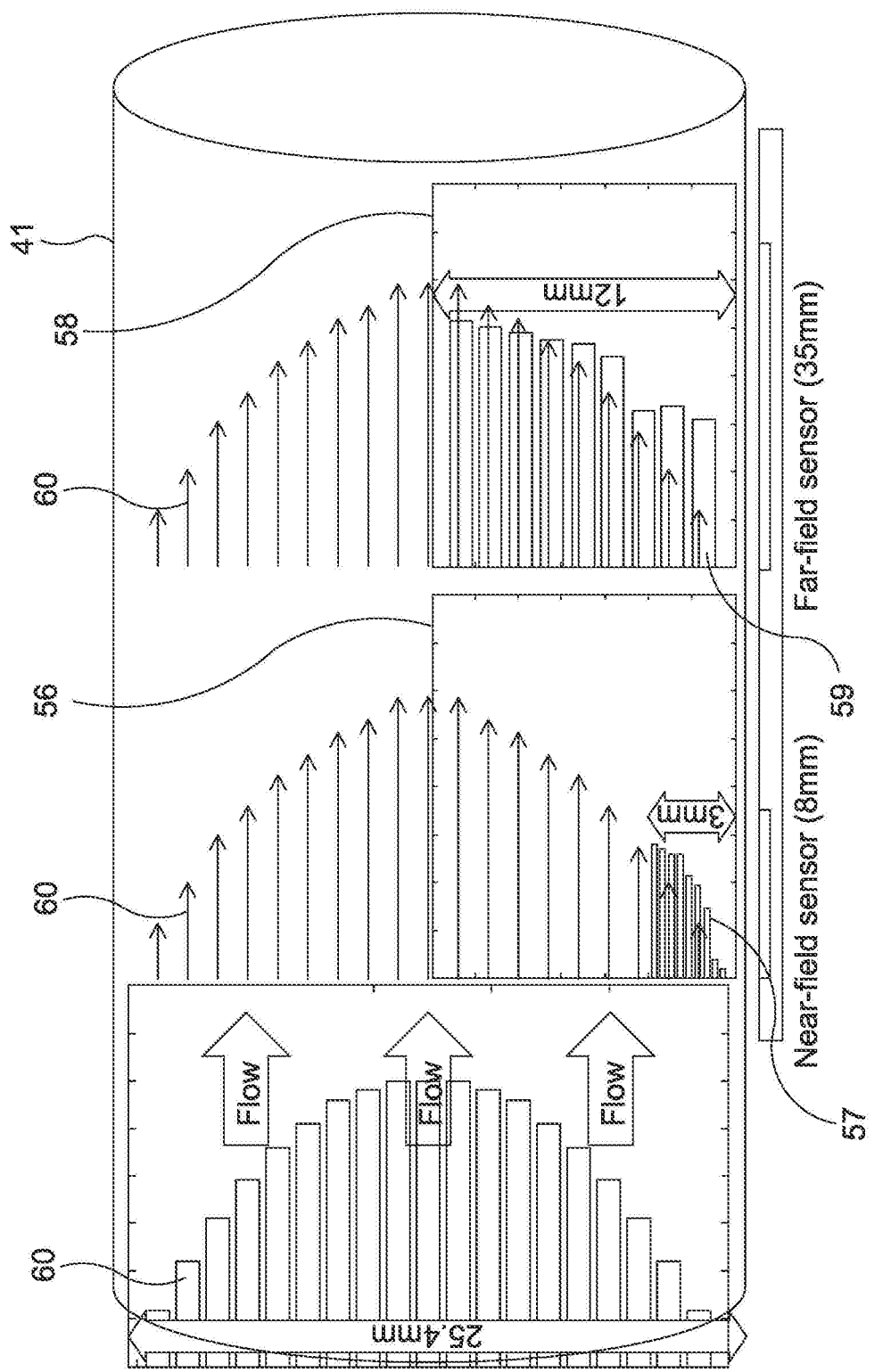

FIG. 12b illustrates flow speed data generated based upon resistivity data collected by the sensor 41 at a second flow condition from both of the first and second arrays 48a, 48b, 49a, 49b. The flow of material was controlled to have an average flow rate of 0.15 m/s, with the pump 43 operated at 40 rpm, providing a mass flow rate of 280 kg/hr. The data illustrated is an average of five tests performed using the same flow conditions.

A model laminar flow distribution 55 is shown in which with each of the bars showing the flow velocity at a vertical location within the sensor 41.

Region 56 illustrates data derived from the near field sensor 49 (i.e. the arrays 49a, 49b) and comprises data bars 57 each of which shows the flow velocity (x-axis) at various positions (y-axis) within the sensor 41 in the region adjacent the wall (i.e. in the near-field).

Region 58 illustrates data derived from the far field sensor 48 (i.e. the arrays 48a, 48b) and comprises data bars 59 each of which shows the flow velocity (x-axis) at various positions (y-axis) within the sensor 41 towards the centre of the pipe (i.e. in the far-field).

Moreover, it can be seen that the data bars 57, 59 generally fit to the scaled model distribution 55.

Figure 12C:
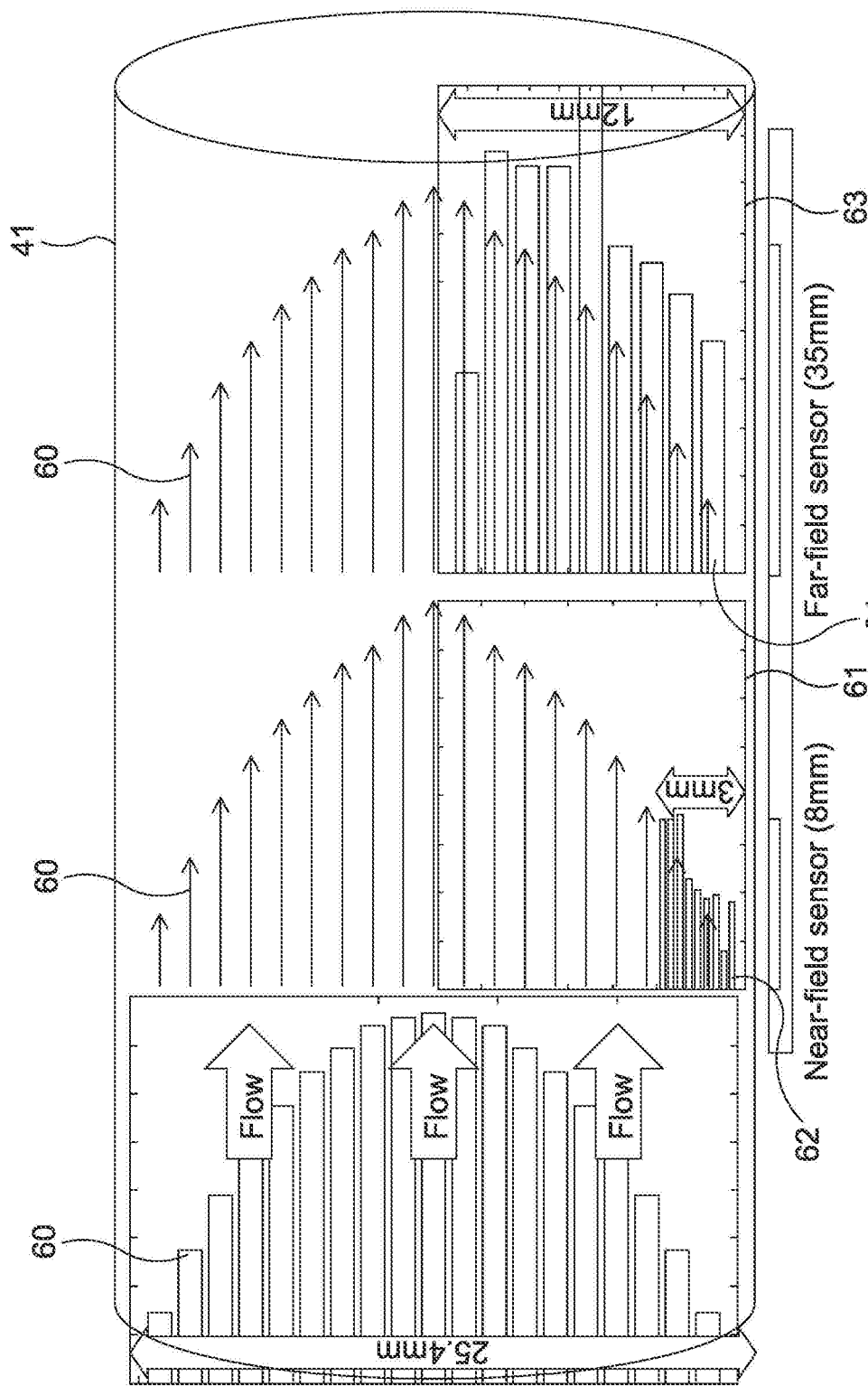

FIG. 12c illustrates flow speed data generated based upon resistivity data collected by the sensor 41 at a third flow condition from both of the first and second arrays 48a, 48b, 49a, 49b. The flow of material was controlled to have an average flow rate of 0.18 m/s, with the pump 43 operated at 50 rpm, providing a mass flow rate of 360 kg/hr. The data illustrated is an average of five tests performed using the same flow conditions.

A model laminar flow distribution 60 is shown in which with each of the bars showing the flow velocity at a vertical location within the sensor 41.

Region 61 illustrates data derived from the near field sensor 49 (i.e. the arrays 49a, 49b) and comprises data bars 62 each of which shows the flow velocity (x-axis) at various positions (y-axis) within the sensor 41 in the region adjacent the wall (i.e. in the near-field).

Region 63 illustrates data derived from the far field sensor 48 (i.e. the arrays 48a, 48b) and comprises data bars 64 each of which shows the flow velocity (x-axis) at various positions (y-axis) within the sensor 41 towards the centre of the pipe (i.e. in the far-field). It can be seen that the data bars 62, 64 generally fit to the scaled model distribution 60.

Figure 13A:
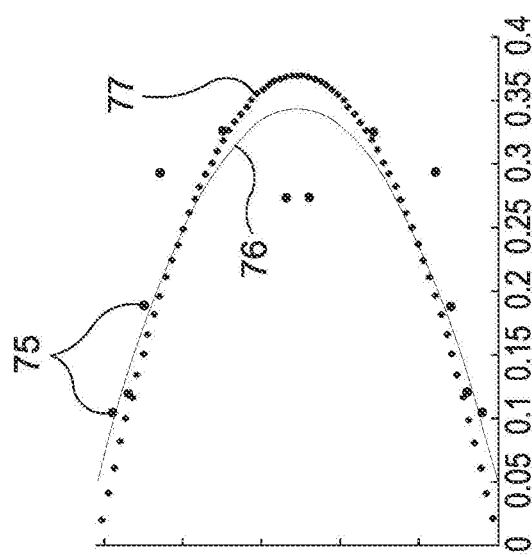
FIGS. 13a to 13c are plots showing velocity profiles derived from the data shown in FIGS. 12a to 12c respectively.
Figure 13B:
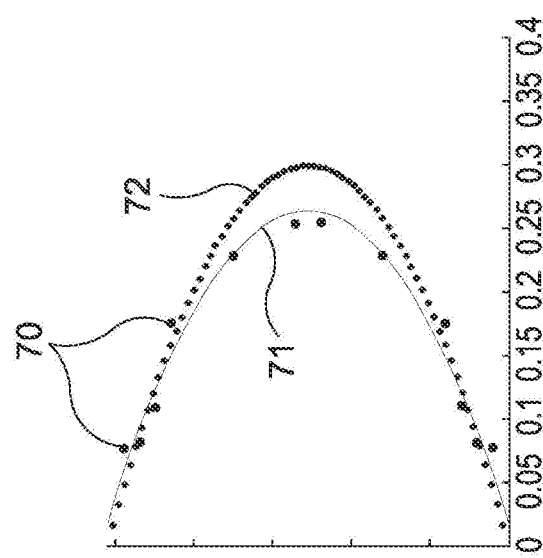
Figure 13C:
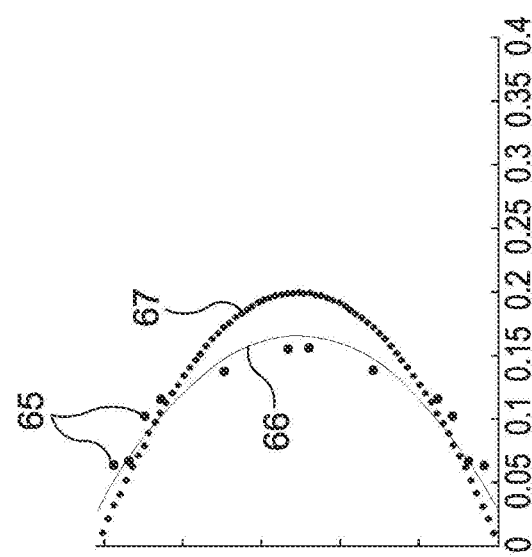

FIGS. 13a to 13c provide a summary of the data shown in FIGS. 12a to 12c respectively. In more detail, FIG. 13a is a plot of the flow profile obtained at the first flow condition (average flow rate 0.1 m/s), in which the flow velocity (x-axis) in m/s is plotted at various positions (y-axis) within the sensor 41.

Data points 65 represent the data bars 52, 54 shown in FIG. 12a. Moreover, while data is collected only from a single side of the sensor 41, the data is mirrored in the plot of FIG. 13a, assuming a symmetrical flow distribution within the sensor 41. Line 66 represents a line of best fit of the data points 65, and is representative of a measured flow velocity profile. A line 67 represents a theoretical flow velocity profile as calculated based upon the Poiseuille equation (1) scaled to fit the data points 65.

Taking an average flow rate for data indicated by line 66 results in an average flow rate of 0.10645 m/s. This corresponds closely with the flow rate of 0.1 m/s, confirming the accuracy of the measured data.

FIG. 13b is a plot of the flow profile obtained at the second flow condition (average flow rate 0.15 m/s), in which the flow velocity (x-axis) in m/s is plotted at various positions (y-axis) within the sensor 41.

Data points 70 represent the data bars 57, 59 shown in FIG. 12b. As described above, while data is collected only from a single side of the sensor 41, the data is mirrored in the plot of FIG. 13b, assuming a symmetrical flow distribution within the sensor 41. Line 71 represents a line of best fit of the data points 70, and is representative of a measured flow velocity profile. A line 72 represents a theoretical flow velocity profile as calculated based upon the Poiseuille equation (1) scaled to fit the data points 70.

Taking an average flow rate for data indicated by line 71 results in an average flow rate of 0.149 m/s. This corresponds closely with the flow rate of 0.15 m/s, again confirming the accuracy of the measured data.

FIG. 13c is a plot of the flow profile obtained at the third flow condition (average flow rate 0.18 m/s), in which the flow velocity (x-axis) in m/s is plotted at various positions (y-axis) within the sensor 41.

Data points 75 represent the data bars 62, 64 shown in FIG. 12c. As described above, while data is collected only from a single side of the sensor 41, the data is mirrored in the plot of FIG. 13c, assuming a symmetrical flow distribution within the sensor 41. Line 76 represents a line of best fit of the data points 75, and is representative of a measured flow velocity profile. A line 77 represents a theoretical flow velocity profile as calculated based upon the Poiseuille equation (1) scaled to fit the data points 75.

Taking an average flow rate for data indicated by line 76 results in an average flow rate of 0.1916 m/s. This generally corresponds with the flow rate of 0.18 m/s, again confirming the accuracy of the measured data.

In general, from the data represented by FIGS. 12a to 12c and 13a to 13c, it can be understood that the techniques described above allow the flow distribution within the sensor to be understood. It will be understood that while there may be some deviation from the modelled flow distribution, it is possible to generate an estimate of the average flow rate from data obtained from the electrode arrays 48a, 48b, 49a, 49b, which, as described above, generally corresponds to the average flow rates as measured by a separate mass flow sensor. Further, the use of first and second arrays 48a, 48b, 49a, 49b allows detailed information regarding both far and near field regions (i.e. different depths) to be obtained.

It is noted that in some cases the flow conditions are not considered to be strictly laminar. For example, where the shape of a tracer pulse is seen to change between a first and second sensing location, it will be understood that the flow may not be entirely laminar. Further, it can be understood that various factors may result in non-ideal conditions for developing laminar flow. For example, changes in pipe diameter (e.g. from pipe 42 at 37.1 mm in diameter to sensor 41 at 25.4 mm in diameter), the sensor 41 being provided close to bends in the pipes 42, and also the injection of tracer material at the disturbance injection portion 46 can all contribute to non-ideal flow conditions.

From the data collected at each flow condition it is also possible to determine a dynamic viscosity as illustrated above with reference to relationship (2). Such information can be used to vary and control process conditions.

Further, from the data collected at each flow condition it is also possible to determine a pressure drop within the material. The pressure drop may be estimated, for example, by use of the Darby-Weisbach equation. Such an estimate may be based upon an assumption that the pipe surface is completely smooth (i.e. there is zero friction at the pipe walls). Pressure drop information may allow additional information regarding the flow conditions or material properties to be obtained.

Further still, information relating to shear stress and/or shear angle within the material can be derived from the measured flow distributions. For example, the shear angle may be determined based upon the angle between the flow distribution and the pipe wall at the wall of the pipe. It is then possible to calculate a shear modulus of the flowing material based upon the determined shear angle.

While nominal or average flow speeds and mass flow rates are known in this experimental setup (by virtue of the mass flow sensor 45), it will be appreciated that the sensor 41 can be used in an environment where such parameters are not known in order to monitor and control various process parameters.

Figure 14:
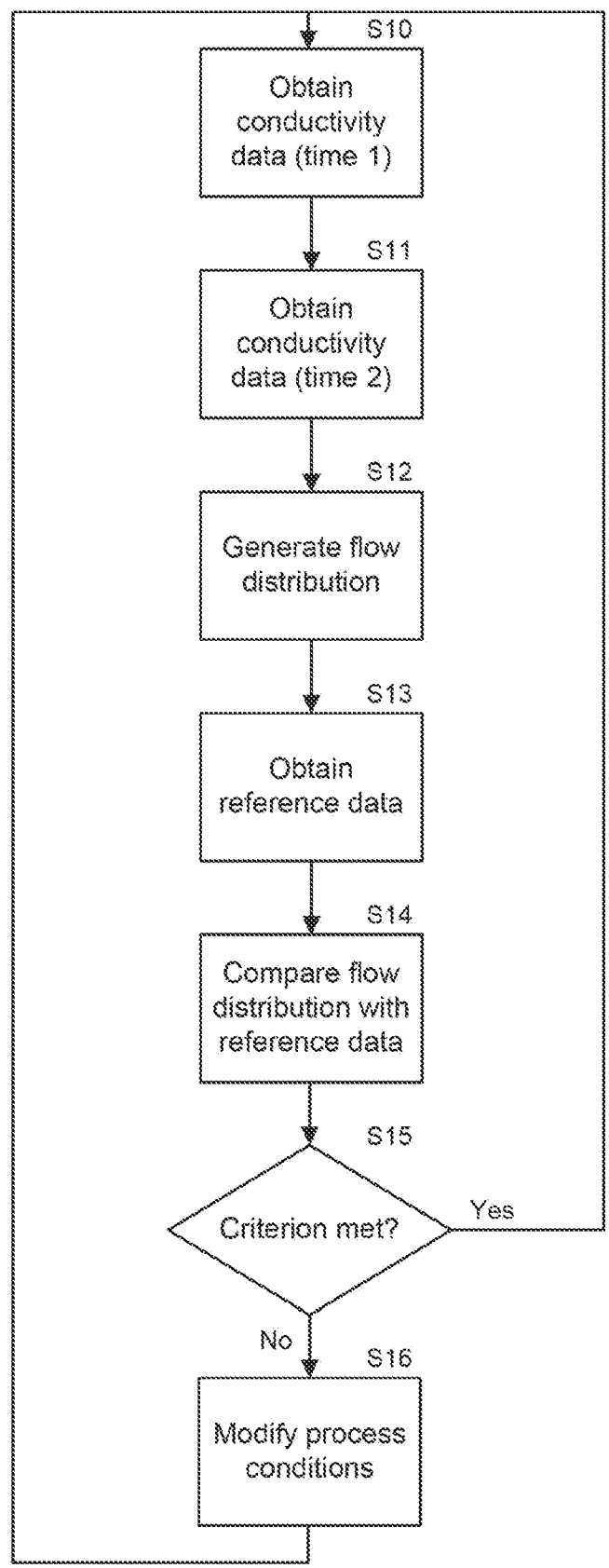
FIG. 14 is a flow chart showing processing performed by the controller of FIG. 3.

FIG. 14 illustrates processing which may be carried out by a process controller so as to modify process parameters based upon measurements obtained by the sensor 41. The controller may be a controller as described above with reference to FIG. 3, and is further operably connected to an industrial control system.

Processing starts at step S10 where conductivity data related to the conductivity of the material 44 adjacent the array of electrodes 48a is obtained during a first time period. The obtained data takes the form of a set of conductivity values each being associated with a sub-region within the sensor 41 adjacent to the array of electrodes 48a, for example, as shown in FIGS. 9a, 9b.

Processing then passes to step S11 where conductivity data related to the conductivity of the material 44 adjacent the array of electrodes 48b is obtained during a second time period. The obtained data takes the form of a set of conductivity values each being associated with a sub-region within the sensor 41 adjacent to the array of electrodes 48b, again as shown in FIGS. 9a, 9b.

Processing then passes to step S12 where the obtained data is processed so as to compare the conductivity data associated with the material adjacent to the two arrays of electrodes 48a, 48b. The physical separation between the two arrays of electrodes 48a, 48b and temporal separation between the first and second time periods is taken into account. The processing at step S12 generates as an output a flow distribution indicating the material flow speed at various positions within the sensor 41, and represents an average of the flow speed between the arrays 48a, 48b. An example flow distribution is shown in FIG. 10a.

Processing then passes to step S13 where reference data indicative of a predetermined flow distribution is obtained. Such reference data may, for example, take the form of a model laminar flow distribution, as shown by flow distribution 50 in FIG. 12. For example the reference data may correspond to predetermined flow distribution and/or a predetermined average flow rate.

Processing then passes to step S14 where the reference data is compared with the flow distribution data generated at step S13. A data indicative of a relationship between the reference data and the flow distribution data is generated. The processing may, for example, comprise generating a fitting parameter or a scaling parameter which indicates how closely (or otherwise) the flow distribution data matches the reference data.

Processing then passes to step S15 where the data indicative of the relationship is compared to a predetermined criterion. For example the predetermined criterion may be a value which the fitting or scaling parameter is compared to, and which is considered to be indicative of an acceptable match between the flow distribution data and the reference data. For example, the comparison may determine whether or not the material flow rate matches a predetermined flow rate, or is within predetermined limits, or has a predetermined distribution (e.g. shape).

If the flow distribution data is considered to be acceptable, processing returns to step S10 where further conductivity data is obtained.

However, if the flow distribution data is not considered to be acceptable, processing passes to step S16 where a process parameter is adjusted. For example, the adjustment may comprise increasing a pump speed so as to increase the material flow rate. Processing then returns to step S10 where further conductivity data is again obtained.

It will be appreciated that the processing described with reference to FIG. 14 is a simple example of a material process being controlled by use of conductivity data obtained by electrode arrays disposed along the direction of material flow as described herein. The processing described may be modified in a number of ways. For example, in addition to the data acquisition described with reference to steps S10 and S11, further data may be obtained from further electrodes arrays (e.g. near-field arrays 49a, 49b) and any such data combined with that obtained from the electrodes arrays 48a, 48b to generate a more detailed flow distribution.

Further, it will be appreciated that the data obtained at steps S10 and S11 may be obtained from a single electrode array during different time periods.

Moreover, the processing at step S14 to generate data indicative of a relationship between the reference data and the flow distribution data may be modified so as to generate data indicative of material properties such as, for example, viscosity. In such an example the comparison at step S15 may determine whether the material viscosity meets a predetermined criterion, and if not, appropriate changes can be made to the process conditions.

More generally the processing at step S14 to generate data indicative of a relationship between the reference data and the flow distribution data may be modified so as to generate data indicative of any material properties which are related to the rheology of the material.

In use, electrodes which are not used as either an energisation or a monitor electrode are left floating, so as to not interfere with the on-going measurements. However, in some embodiments additional ground electrodes may be provided which act to isolate the region of the material which influences the measurements. For example, an array of eight electrodes may be provided with an additional electrode at either end of the array, which serves as a ground electrode. In the example provided above, a linear array of ten electrodes is provided in which the electrodes at either end are connected to ground, while the eight central electrodes are used as energisation and monitor electrodes.

In the embodiments described above, two sets of electrode arrays are generally used, namely, a set of far-field electrode arrays (e.g., electrode arrays 48a and 48b as described above with reference to FIG. 8) and a set of near-field electrode arrays (e.g., electrode arrays 49a and 49b). However, it will be appreciated that more than two sets of electrode arrays may be used in the sensor 41.

Figure 15:
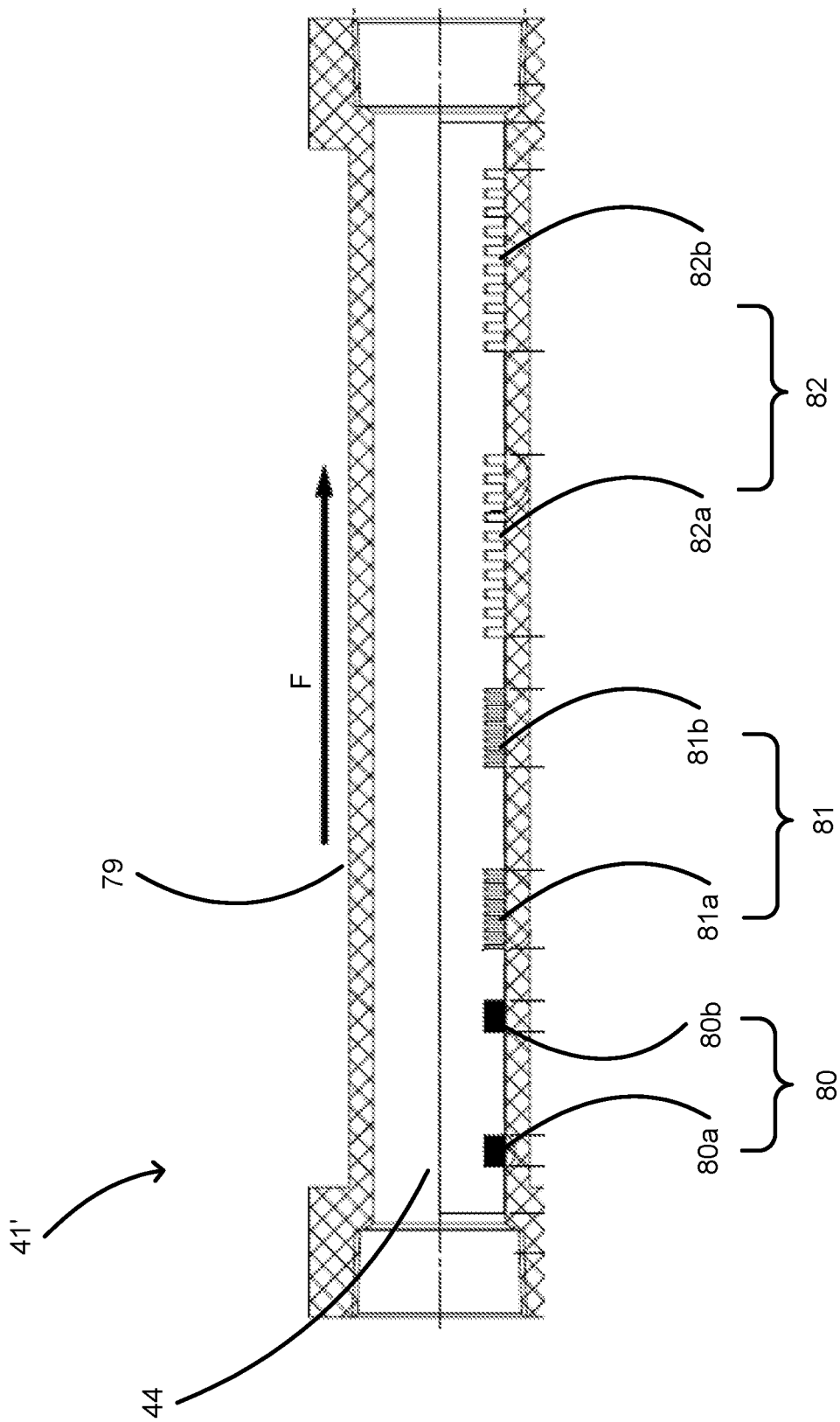
FIG. 15 is a schematic illustration of an apparatus according to a further embodiment of the invention.

FIG. 15 illustrates a sensor 41', which is an alternative embodiment of the sensor 41 of FIG. 8. The sensor 41' may, for example, be used in the test apparatus 40 of FIG. 8, to replace the sensor 41 therein. As shown in FIG. 15, the sensor 41' comprises a portion of pipe 79, which may be within the flow loop of the apparatus 40 to allow the material 44 to flow through the sensor 41'. The sensor 41' has two first linear electrode arrays 82a, 82b, two second linear electrode arrays 80a, 80b and two third linear electrode arrays 81a, 81b.

Each electrode array contains a plurality of individual electrodes. The spacing of the electrodes within the first linear electrode arrays 82a, 82b along (i.e. axially) the direction in which the arrays extend is greater than that of the electrodes within the third linear electrode arrays 81a, 81b, which is further greater than that of the electrodes within the second linear electrode arrays 80a, 80b. As a result, the first electrode arrays 82a, 82b are able to sense material at a greater depth than the third electrode arrays 81a, 81b, which in turn are able to sense material at a greater depth than the second electrode arrays 80a, 80b. That is, the depth of the material 44 from the first electrode arrays 82a, 82b which significantly influences the measurement performed by the first electrode arrays 82a, 82b is greater than the depth of the material 44 from the third electrode arrays 81a, 81b which significantly influences measurements performed by the third electrode arrays 81a, 81b, which is in turn greater than the depth of the material 44 from the second electrode arrays 80a, 80b which significantly influences measurements performed by the second electrode arrays 81a, 81b.

The second electrode arrays 80a, 80b may therefore be referred to as near-field arrays, and may together be referred to as a near-field sensor 80. The third electrode arrays 81a, 81b may be referred to as mid-field arrays, and may together be referred to as a mid-field sensor 81. The first electrode arrays 82a, 82b may be referred to as far-field arrays, and may together be referred to as a far-field sensor 82.

Within the sensors 80, 81 and 82, the far-field sensor 82 provides information regarding the flow rate of the material 44 at the greatest depth into the sensor 41', with the near-field sensor 80 the least depth and the mid-field sensor 81 therebeween. The sensor 82 is therefore sensitive at far-field regions distant from the electrodes. The sensor 80 is sensitive at near-field regions near to the electrodes. The sensor 81 is sensitive at mid-field regions between the near-field regions and the far-field regions.

By comparing the results of the sensors 41 and 41', it has been found that increasing the sets of electrode arrays used in the sensor allows the obtaining of measurement data indicative of the velocity of the material 44 which is more accurately representative of material within the sensor 41'. This in turn allows for more accurate and reliable estimation of a velocity profile of the material 44 flowing through the sensor 41'.

In an example, each of the electrode arrays 80a, 80b, 81a, 81b, 82a, 82b contains ten individual electrodes. The electrodes within the first electrode arrays 82a, 82b each have a length of 1.80 mm and a spacing of 1.89 mm between adjacent electrodes axially. Accordingly, the total length of each first electrode array 82a, 82b is 35 mm. The electrodes within the second electrode arrays 80a, 80b each have a length of 0.3 mm and a spacing of 0.33 mm between adjacent electrodes axially (i.e., along the direction of flow as shown in FIG. 15). Therefore, the total length of each second electrode array 80a, 80b is 6 mm. The electrodes within the third electrode arrays 81a, 81b each have a length of 0.78 mm and a spacing of 0.80 mm between adjacent electrodes axially. Accordingly, the total length of each third electrode array 81a, 81b is 15 mm. It will be appreciated that the dimensions of the electrode arrays 80a, 80b, 81a, 81b, 82a, 82b are not limited to the above example. Preferably, the dimensions of the electrode arrays are selected based upon the dimension of the pipe 79. In particular, the spacings between adjacent electrodes within the electrode arrays are selected such that the depth sensitivity of the electrode arrays can, in combination, reach both the near-wall region and the central region of the pipe 79.

Although in the example illustrated by FIG. 15, three sets of electrode arrays are used. It will be appreciated that more than three sets of electrode arrays with different depth sensitivities may be used in the sensor 41' if required. In general terms, the number of electrode arrays used in a particular application will be selected so as to provide an acceptable compromise between, on the one hand, the space required to accommodate the electrode arrays and the signal processing complexity associated with increased signal acquisition, and, on the other hand, the improved sensing performance (in terms of resolution and depth penetration) associated with an increased number of electrode arrays.

Furthermore, it will be appreciated that the use of more than two sets of electrode arrays having different depth sensitivities covering range of depths (e.g. from a near-field region to a far-field region) can be used in combination with any of the other techniques described herein. For example, such an arrangement of sensors may be used in a mixing vessel (such as a mixing vessel described above with reference to FIGS. 6a and 6b).

Each of the electrode arrays 80a, 80b, 81a, 81b, 82a, 82b has a width along a circumferential direction of the pipe 79 (i.e., a direction which is perpendicular to the direction in which the arrays extend, and also perpendicular to the direction of flow of material within the pipe 79). In the embodiment illustrated in FIG. 15, the width of each electrode array is selected to be equal to a half of the inner circumferential perimeter of the pipe 79. For example, where the diameter of the pipe 79 is 25.4 mm, the width of each electrode array may be around 39.89 mm. All of the electrode arrays 80a, 80b, 81a, 81b, 82a, 82b therefore have a uniform width along a circumferential direction of the pipe 79.

As described above in relation to FIG. 2, the width of the electrode arrays does not itself directly affect the measurement resolution or field-of-view. Moreover, by increasing the width of the electrode arrays to a half of the inner circumferential perimeter of the pipe 79, it has been found that the signal-to-noise ratio (SNR) in the measurement results obtained by using the electrode arrays is greatly improved, as shown in FIG. 16.

Figure 16:
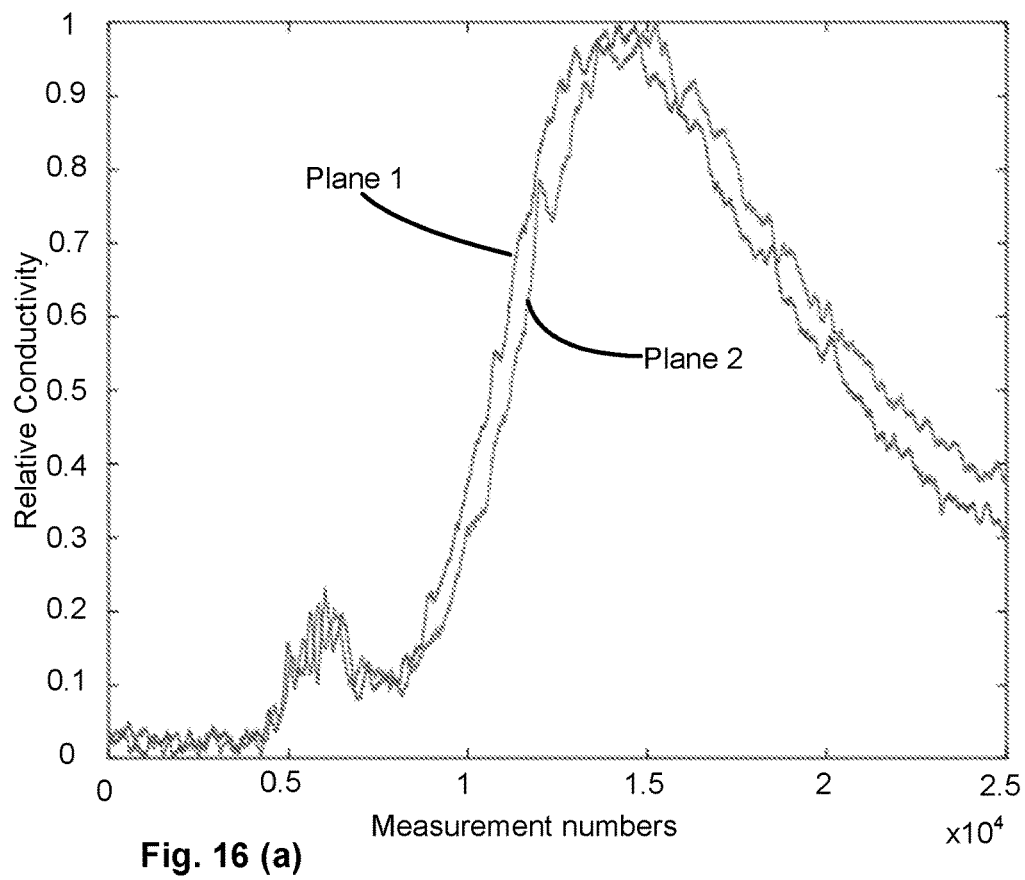
FIGS. 16a and 16b are plots of a characteristic of material at two locations within the apparatus of FIG. 15 using data obtained with electrodes having different widths.
Figure 16:
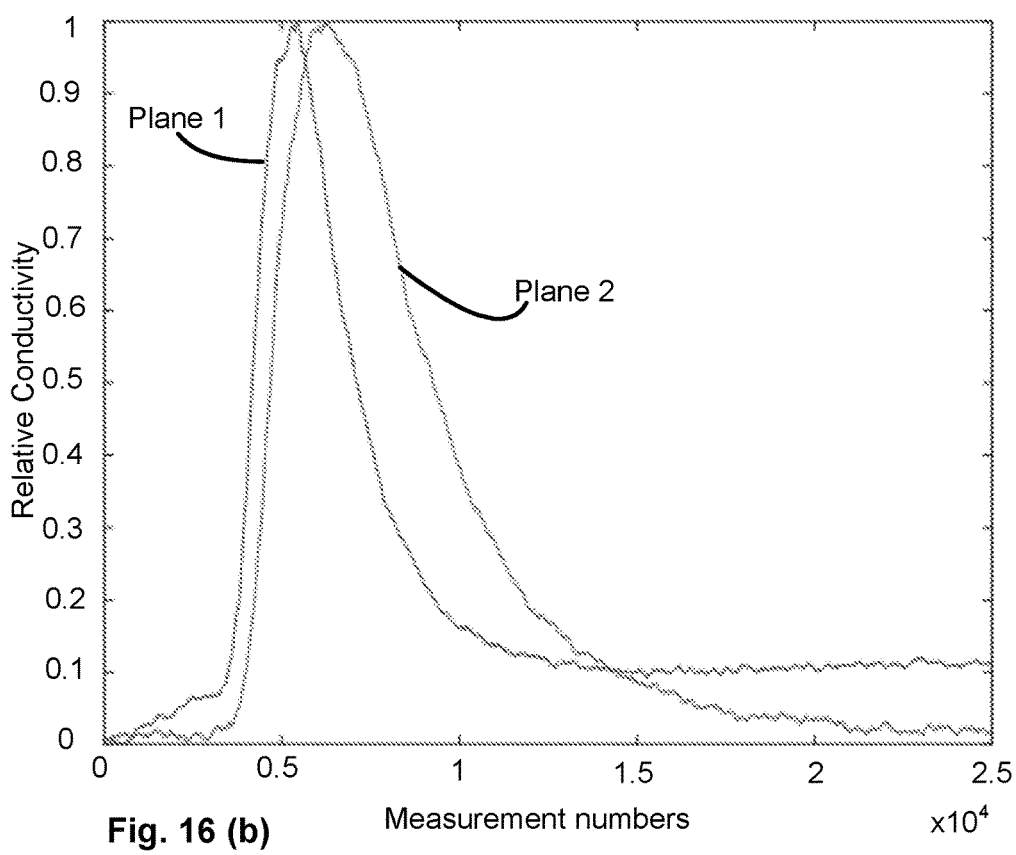

FIG. 16 shows the measured conductivity (y-axis) of the material 44 in a far-field region (i.e., the centre-region of the pipe 79) as measured at the electrode arrays 82a and 82b across an extended duration. FIG. 16(a) represents the measurements taken where the width of the electrode arrays 82a, 82b is equal to around ⅕ of the inner circumferential perimeter of the pipe 79. FIG. 16(b) represents the measurements taken where the width of the electrode arrays 82a, 82b is equal to around ½ of the inner circumferential perimeter of the pipe 79. The measurements in both figures are conducted in a similar way to that described above with reference to FIG. 11. In particular, the x-axis represents time, with data relating to 25000 readings illustrated within the plot. The conductivity values are normalised to 1 to show relative changes. The curve identified as "Plane 1" represents the data collected by the electrode array 82a. The curve identified as "Plane 2" represents the data collected by the electrode array 82b. The time delay between the "Plane 1" curve and the "Plane 2" curve represents the time take for the material 44 in the centre of the pipe to travel from the region in front of the electrode array 82a to the region in front of the electrode array 82b.

As shown in FIG. 16(a), where the width of the electrode arrays 82a, 82b is equal to around ⅕ of the inner perimeter of the pipe 79, the conductivity curves include multiple small spikes superimposed on a main pulse. This indicates a high level of noise and accordingly a low SNR in the measured signal. Such a high level of noise may cause inaccuracies in estimating the true amplitude of the measured signal, which may further compromise the accuracy in measuring the velocity of the material 44. In contrast, the conductivity curves as shown in FIG. 16(b) are significantly smoother. This indicates an enhanced SNR in the measured signals when the width of the electrode arrays 82a, 82b is increased to around ½ of the inner perimeter of the pipe 79. It will be appreciated, therefore, that an enhanced SNR allows the velocity of the material to be measured with improved accuracy.

In general terms, it has been discovered that by increasing electrode width to a certain extent in a direction substantially perpendicular to the flow of material past a sensor an improved signal to noise ratio can be obtained. However, the relationship between the width of the electrode arrays and the SNR is not linear. For example, where the width of the electrode arrays is a substantial portion of the perimeter of the pipe 79, further increases in electrode width may result in a greater level of noise and accordingly a lower SNR. It is understood that entrained air bubbles within the material being monitored can negatively affect measurement results when they pass through the regions around the electrodes (i.e. the regions of material upon which measurements are performed). When the width of electrodes within an array is increased to be over a substantial portion (for example, over 75%) of the perimeter of the pipe 79, noise in measurement results caused by the interaction of the entrained air bubbles and the electrode arrays may outweigh any benefit provided by the increased electrode width, thereby resulting in a lower SNR.

It will be understood that an appropriate electrode width may be selected for each application, or for each array, and that in each case a compromise will be found between providing a sufficiently large width to improve electrode size, while not increasing the width to an extent that noise is further increased. The optimal electrode width may thus vary between different applications. For example, in an application where there is expected to be a significant amount of entrained air, the electrode width may be selected to be around 40% of the perimeter. On the other hand, in an application where there is expected to be a small amount of entrained air, the electrode width may be selected to be around 60% of the perimeter.

It will thus be understood that where it is said that electrode arrays may preferably extend around a half of the perimeter of the pipe, it is meant that electrodes may extend around a substantial portion of a pipe, such as, for example, greater than 20% of the perimeter of a pipe. More preferably, electrodes may extend around greater than 40% of the perimeter of a pipe.

Additionally, or in the alternative, where it is stated that electrode arrays may preferably extend around a half of the perimeter of a pipe, it is meant that electrodes may extend around, for example, less than 75% of the perimeter of a pipe. More preferably, electrodes extend around less than 60% of the perimeter of a pipe.

It will also be appreciated that, in order to reduce the noise caused by entrained air bubbles within the material, electrode arrays are preferably located towards a bottom half of pipes which are generally horizontal in use. The air bubbles, due to their low density, are more likely to flow through an upper region of a pipe. By arranging the electrode arrays to be towards a bottom region of a pipe, the air bubbles are separated from the electrode arrays as far as possible and accordingly the noise introduced by the air bubbles into the measurement results may be greatly reduced.

Of course, it will be appreciated that a disturbance may occur in different portions of a pipe. For example, rather than air bubbles, a disturbance may be related to the presence of sediment which is known to form at the bottom of the pipe. Thus, electrodes may be arranged around a predetermined portion of a pipe in order to avoid a particular noise source.

It will, of course, be appreciated that the increased electrode width described above may be used in combination with any of the above described embodiments (e.g. those having only near-field and far-field sensors) or even in embodiments having electrode arrays with a common electrode spacing.

The measurement data generated by the sensor 41' described above with reference to FIG. 15 may, for example, be processed in a similar way to that explained above for the sensor 41 in relation to FIGS. 10, 12, 13 and 14, so as to estimate a flow velocity profile of the material 44.

In more detail, near-field, mid-field and far-field velocity data may be calculated based upon the outputs of the near-field, mid-field and far-field sensors 80, 81 and 82, respectively. The calculation of the velocity data may be carried out as generally as described above with reference to Steps S10, S11 and S12 of FIG. 14. However, additional processing steps may be performed so as to provide improved correlation between a generated flow velocity profile and an actual flow velocity profile.

In particular, each velocity data item generated by the three sensors 80, 81, 82 may be considered to represent a measured velocity within a particular region having a particular depth into the sensor 41'. However, so as to ensure that the measured velocity data is associated with the correct depth within the sensor 41', the measured velocity data from the sensors may be mapped (or adjusted) to appropriate depths by use of predetermined depth factors (as described in more detail below). A depth factor is a relative adjustment factor allowing measurement data to be scaled so as to match actual material properties.

Velocity data obtained from each of the sensors 80, 81 and 82 may, for example, comprise nine velocity measurements which correspond to layers occupying positions one nine as shown in FIG. 10A or 10B. Each position corresponds to a layer, with the layer occupying position one representing a region which is closer to the wall of the sensor than that represented by the layer occupying position nine. The depth of each layer into the sensor is initially determined based upon an expected penetration depth of the sensor. The layer depth may also depend upon the geometry of the sensor, and the image reconstruction algorithm used to generate conductivity data from electrical measurements. However, nominal depth values generated based upon the expected penetration depth of the sensor may not be accurate, and may be improved using a predetermined depth factor.

FIG. 12A illustrates an exemplary mapping of data using nominal depth values. For example, nine velocity measurements obtained from a far-field sensor as shown in FIG. 10A may be mapped into separate depths within a range of 12 mm, from the wall of the sensor as shown in FIG. 12A. In the example shown in FIG. 12A, the nine velocity measurements are linearly mapped to depths within this range, indicating that the depth factors used for mapping each layer in this example are the same.

That is, an adjustment factor of around three is used for processing described above with reference to FIG. 12A, with the various measurements obtained from the sensor being equally distributed across a depth of 12 mm, the depth of 12 mm being approximately one third of the length of the sensor (which length is 35 mm).

However, in the modified processing which uses a predetermined depth factor (as described in more detail below), a different predetermined depth factor may be applied to each of the velocity measurements based upon the layer position, such that the predetermined depth factor applied to a measurement corresponding to a layer occupying positon one may be different to the predetermined depth factor applied to a measurement corresponding to a layer occupying positon nine.

Once the velocity data has been mapped based upon the predetermined depth factors, the velocity data points may each be considered to accurately represent a velocity of the material at the corresponding depth. The mapped velocity data may, for example, comprise a plurality of data points which are equivalent to data points 65, 70 and 75, as shown in FIG. 13. Subsequently, the mapped velocity data may be fitted to a curve (such as, for example, curves 66, 71 and 76 as shown in FIG. 13) using a suitable fitting algorithm. The fitted curve represents the measured flow velocity profile.

Thus, as compared to the use of a uniform adjustment factor (such as, for example, the value three, as described above with reference to FIG. 12), the use of predetermined depth factors may improve the accuracy of any measure flow velocity profile. In order to obtain accurate predetermined depth factors for velocity data obtained from the sensors 80, 81 and 82, an additional calibration process may be performed. The predetermined depth factors may be empirically determined.

In some embodiments such a calibration process may include causing a reference material having known properties (e.g. a Newtonian fluid) to flow through the sensor 41' under controlled flow conditions with a flow profile which corresponds to a reference flow profile. The reference flow profile may be known or may be estimated based upon the parameters of the controlled flow conditions.

Data indicative of the velocity of the reference material is obtained from each of the sensors 80, 81 and 82. The obtained velocity data is then compared to the reference flow profile of the fluid and adjusted so as to fit the reference flow profile. The adjustments made to the velocity data generated by each of the sensors 80, 81 and 82 may, for example, involve applying a scaling factor to the velocity data generated by each of the sensors 80, 81 and 82. The scaling factor required to ensure that the generated data fits closely to the reference flow profile may be referred to as a depth factor. The depth factors calculated in this way may be deemed to be indicative of the real performance of the sensors 80, 81, 82, and can thus be used in subsequent velocity profile estimations of any material which flows through the sensor 41'.

The effect of the calibration process described above on the accuracy of the velocity profile generation is now described in more detail with reference to FIG. 17.

Figure 17:
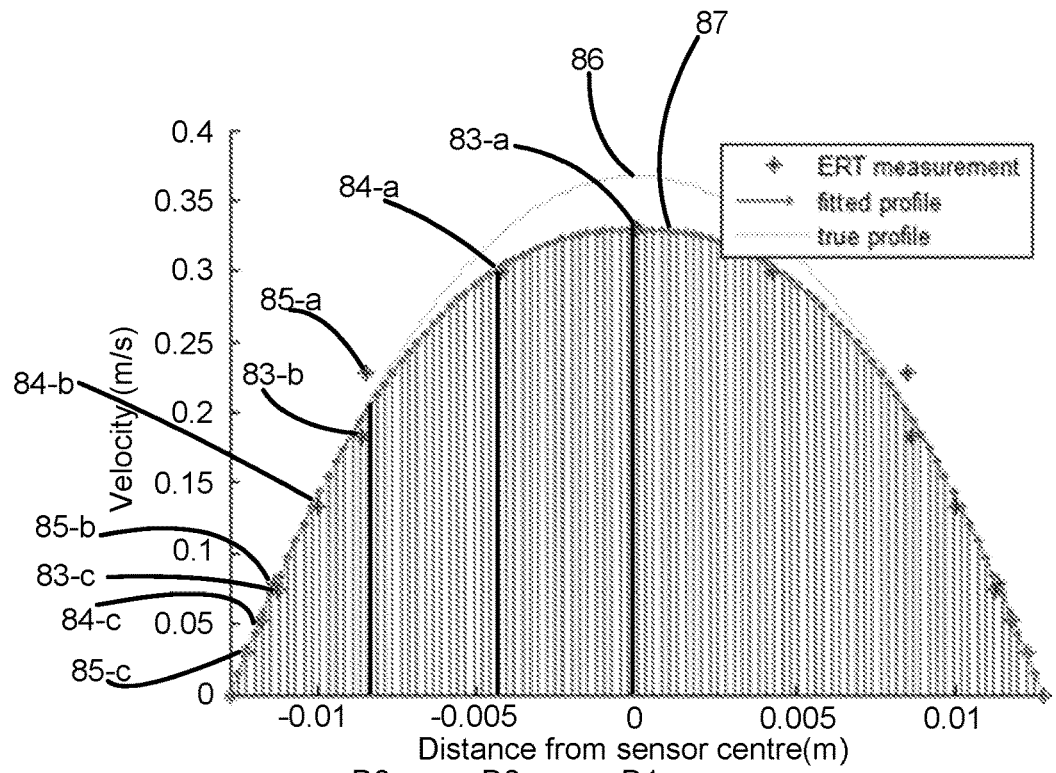
FIGS. 17a and 17b are plots showing velocity profiles derived from data generated by the apparatus of FIG. 15.
Figure 17:
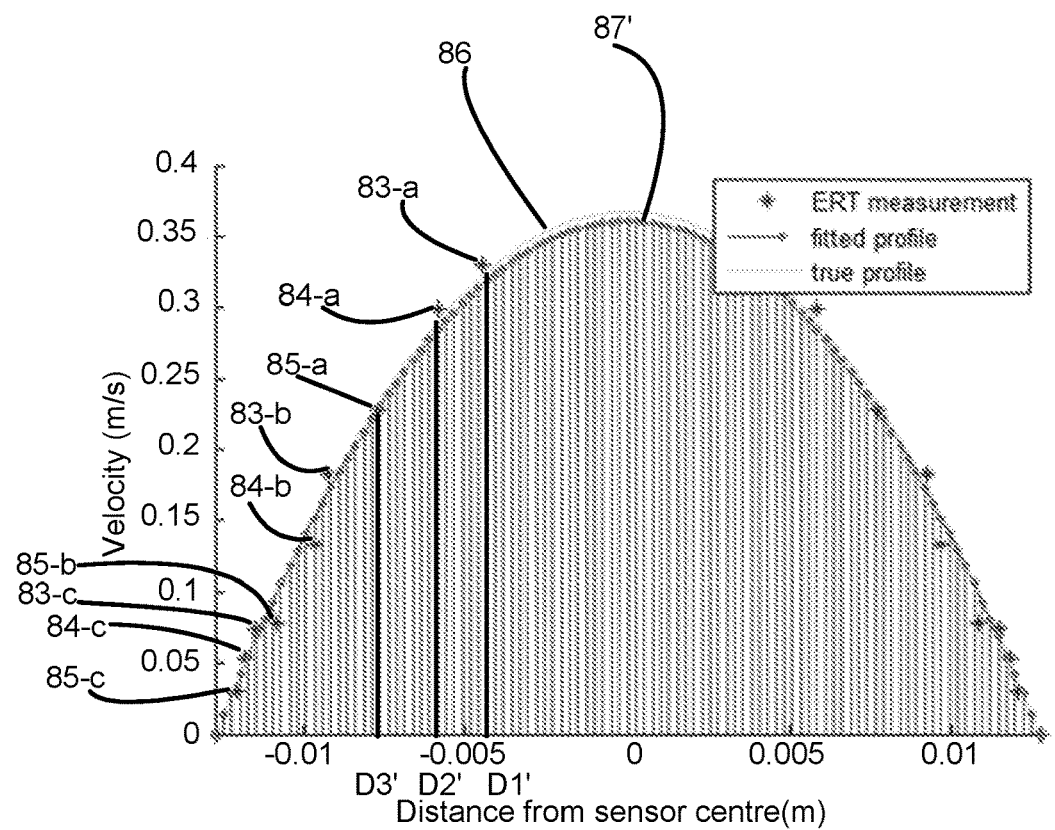

FIG. 17 illustrates a relationship between the velocity of a material flowing within the sensor 41' (in the y-axis) and a distance from the centre of the sensors 80, 81, 82 (in the x-axis). Each of FIGS. 17(*a*) and 17(*b*) depicts a plurality of individual velocity data points of a fluid (including velocity data points 83*a-c*, 84*a-c*, 85*a-c*) flowing within the sensor 41', a fitted velocity profile 87 or 87' generated based upon the individual velocity data, and a reference flow distribution profile 86 of the fluid, which may be referred to as a true profile. Each of the velocity data points 83*a-c*, 84*a-c* and 85*a-c* are initially associated with a respective nominal depth based upon to an expected penetration depth of the sensor.

FIGS. 17(*a*) and 17(*b*) use the same set of velocity data obtained from the sensors 80, 81 and 82 for a fluid flowing through the sensor 41'. The fluid is controlled so as to have a known flow distribution profile (i.e. the true profile 86). In this example, nine velocity measurements are obtained from each of the sensors 80, 81 and 82. An average is taken of these nine velocity measurements, so as reduce measurement noise, with three averaged velocity measurements being generated from data obtained from each of the sensors 80, 81 and 82 (i.e. resulting in nine measurements in total). Velocity data points 83-a, 84-a and 85-a are averaged data obtained from the far-field sensor 82. Velocity data points 83-b, 84-b and 85-b are averaged data obtained from the mid-field sensor 81. Velocity data points 83-c, 84-c and 85-c are averaged data obtained from the near-field sensor 80. While data is collected only from a single side of the sensor 41', each of the nine velocity data points are mirrored to the right side of the plot of FIG. 17(a) or 17(b), assuming a symmetrical flow distribution within the sensor 41'.

FIG. 17(a) uses a single adjustment factor, which, as described above, maps the measurement data to depths evenly distributed within a depth which is around one third of each array length. On the other hand, FIG. 17(b) uses predetermined depth factors obtained from the calibration process as described above.

In more detail, FIG. 17(a) illustrates the mapping of velocity data points to expected depth values using a nominal adjustment factor, which causes the data points 83-a, 84-a and 85-a to be mapped to depths as shown by depth data points D1, D2 and D3, respectively. On the other hand, FIG. 17(b) uses predetermined depth factors obtained from the calibration step as described above, with the same data points 83-a, 84-a and 85-a instead being mapped to depth data points D1', D2' and D3', respectively. Similar mappings are performed for each of the data points illustrated in FIG. 17 (i.e. data points 83-b, 84-b, 85-b, 83-c, 84-c and 85-c).

Previously it has been assumed that an adjustment factor used to calculate a depth associated with a velocity data obtained from the electrode array, should result in a total measurement depth corresponding to around one third of the electrode array length. Moreover, it has been assumed that the depth factors for velocity data points corresponding to different layers (for example, layers being indicated by positions one to nine in FIG. 10) are the same. As described above, FIG. 17(a) uses this single adjustment factor.

The results of the calibration process, however, indicate that, overall, the depth of material which the sensors penetrate (i.e. which depth corresponds to the appropriate depth factor) is less than the assumed value of three, such that the maximum depth penetration is around one fourth of the array length. Further, the appropriate depth factor for velocity data relating to different layers (for example, layers occupying positions one to nine in FIG. 10) also varies. In particular, an appropriate depth factor for velocity data relating to a layer close to the wall of the sensor may be smaller than a depth factor for velocity data relating to a layer further away from the wall of the sensor. In the example described with reference to FIG. 10, the appropriate depth factors obtained from the calibration process increase from the layer occupying position one to the layer occupying position nine (where layer one represents a region which is closer to the wall of the sensor than that represented by layer nine). The correct depth factors may be obtained through the calibration processes as described above, with the use of such depth factors being illustrated in FIG. 17(b).

By way of example, a set of depth factors which are obtained by the process described above may be as described below. Assuming a depth profile initially being separated into nine equal layers (e.g. as shown in FIG. 10), an exemplary depth factor associated with the each layer is shown in Table 1.

TABLE 1

| Layer n | Depth Factor $F_d(n)$ | Mapped Depth $d(n)$ * (mm) | Previous Depth Factor $F_d(n)$ | Previous Mapped Depth $d(n)$ * (mm) |
| --- | --- | --- | --- | --- |
| 1 | 0.62 | 6.27 | 3 | 1.30 |
| 2 | 1.22 | 6.38 | 3 | 2.59 |
| 3 | 1.77 | 6.59 | 3 | 3.89 |
| 4 | 2.27 | 6.85 | 3 | 5.19 |
| 5 | 2.72 | 7.14 | 3 | 6.48 |
| 6 | 3.12 | 7.48 | 3 | 7.78 |
| 7 | 3.47 | 7.85 | 3 | 9.07 |
| 8 | 3.78 | 8.23 | 3 | 10.37 |
| 9 | 4.03 | 8.68 | 3 | 11.67 |

In addition to depth factors, a mapped depth for each of layers one to nine is shown (assuming an electrode array length of 35 mm). By way of comparison, a constant depth factor of three, and the resulting mapped depth for each of layers one to nine using such a depth factor is shown (also assuming an electrode array length of 35 mm).

From the data shown in Table 1, it can be understood that whereas previously the layer depth values obtained were uniformly distributed across a depth corresponding to one third of the array length, the use of empirically determined depth factors allows a non-linear layer distribution to be used, with layer depth values more closely distributed between around one ninth and one fifth of the array length. Moreover, it will be noted that depth factors shown increase approximately linearly with layer number.

The mapped depth associated with each of layers is calculated according to equation (3):

$$d(n) = \frac{n}{N} \cdot \frac{L}{F_d(n)}, \qquad (3)$$

where:
d(n) is the mapped depth for a particular layer n,
n is the layer number,
N is the total number of layers,
L is the array length, and
$F_d(n)$ is the depth factor, which varies for each layer n.

It is noted that analysis performed on a number of different array geometries has yielded depth factors having similar values associated with each of the nine layers. That is, the depth factor values are relatively insensitive to array length, and thus provide a relative scaling factor which can be applied to arrays of different lengths. For example, the same depth factor may be applicable to velocity data obtained in a first layer when measured by each of the near-, mid- and far-field sensors.

Of course, it will be appreciated that the depth factor and mapped depth values shown in Table 1 are shown by way of example only, and real values may vary according to each application. An appropriate depth factor may vary based upon factors such as, for example, the array geometry and alignment, the arrangement of the array within a pipe or vessel, the material flowing within the array, the material temperature, etc.

Moreover, it is noted that the selection of the number of layers (nine in the examples described above) is arbitrary and may be varied as required. Moreover, the appropriate depth factors for use may depend not only on the number of layers selected, but also on the processing used to generate a conductivity image from measurement data. Similarly, a nominal depth value associated with a measurement data item may be scaled by a constant factor prior to the use of a depth factor which relates to the particular sub-region within the apparatus. However, in general terms, the use of depth factors provides a way of mapping measurement data to real depth values by use of reference data obtained from a calibration process.

The mapped velocity data points shown in each of FIGS. 17(a) and 17(b) are then fitted to generate a velocity profile. As clearly shown, the fitted profile 87' of FIG. 17(b) matches the true profile 86 more closely than the fitted profile 87 of FIG. 17(a). This indicates the improved accuracy of the velocity profile estimation process, due to the use of the depth factors as generated by the calibration process described above.

It will be appreciated that the calibration process may be performed before conducting any velocity profile estimation, and subsequently may be repeated at suitable time periods as required. That is, the calibration process (and generation of depth factors) may be performed as part of an initialisation procedure for a particular sensor. It will be appreciated that the generated depth factors are each associated with a particular sensor geometry, and thus will depend upon the electrode arrangement (e.g. length, width, spacing etc.) and also the orientation of the electrodes within the sensor, and the arrangement of the sensor within a pipe or other operating environment. As such, it may be possible to perform a calibration process upon installation of a new sensor, and for the generated depth factors to be stored in a memory associated with the controller 10 for subsequent use.

Alternatively, the depth factors may be obtained from measurements performed by an alternative measurement apparatus having similar characteristics to the measurement apparatus.

It will, of course, be appreciated that the use of depth factors may be used in combination with any of the above described embodiments (e.g. those having only near-field and far-field sensors) or even in embodiments having electrode arrays with a common electrode spacing, or even a single electrode array.

More generally it will be appreciated that depth factors are an example of reference data which may be used to improve the accuracy of generated data relating to the rheology of material around a sensor. That is, data indicative of properties of the material is generated based upon measurement data and further based upon reference data (e.g. one or more depth factors).

As described above (both in the context of the use of depth factors, and processing described with reference to FIG. 14, for example at step S14), a fitting algorithm is used to fit the generated velocity data to a velocity curve, which may be referred to as a flow velocity profile. A polynomial fitting algorithm is a commonly used algorithm for such fitting operations. However, it has been found that, in some circumstances, a Gauss-Newton algorithm may provide more accurate fitting results than a polynomial fitting algorithm, especially for viscous fluids. To further improve the fitting accuracy, data indicative of relationships between various fluid properties may also be taken into account. For example, models which describe the relationship between various fluid properties (e.g. viscous stress and the strain rate within the fluid) may be used. Such a model may be provided as an input to the fitting algorithm so as to further improve the fit performance. Such models may include, for example, a Newtonian fluid model, a Power-law fluid model and a Herschel-Bulkley fluid model. It will, of course, be appreciated that alternative fluid models may be used as appropriate for a particular material.

Figure 18:
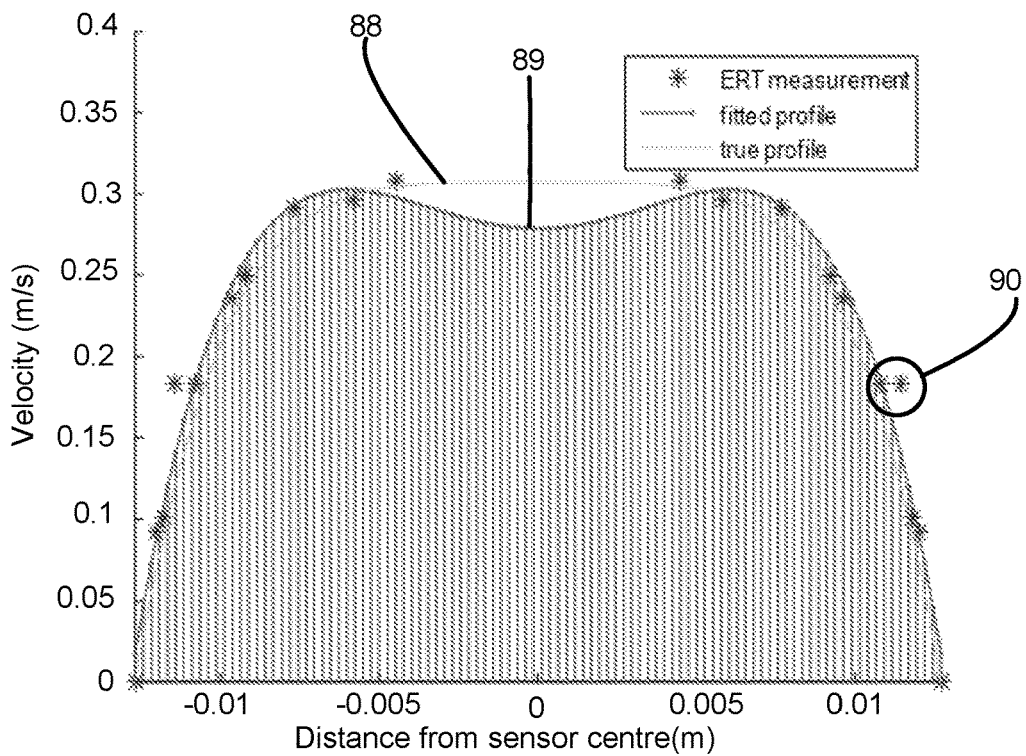
FIGS. 18a and 18b are plots showing velocity profiles derived from data generated by the apparatus of FIG. 15.
Figure 18:
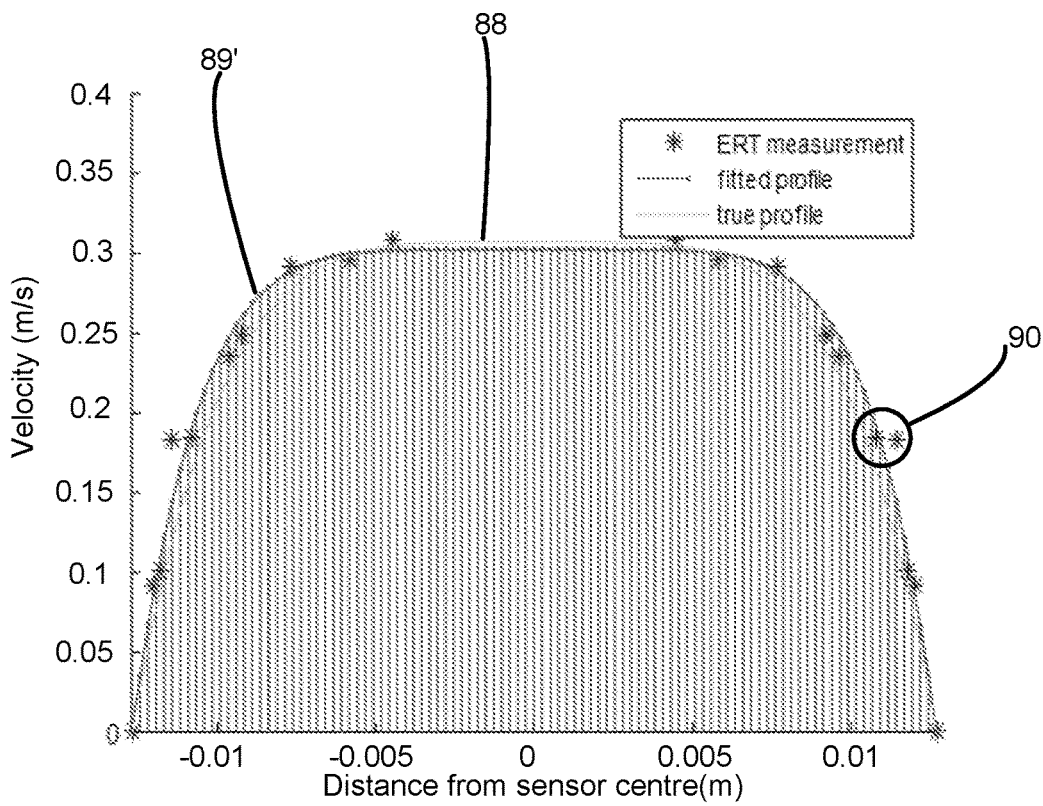

FIG. 18 illustrates a comparison between the fitting accuracy provided by a traditional polynomial fitting algorithm (as shown in FIG. 18(a)) and that provided by an improved Gauss-Newton algorithm with fluid properties input (as shown in FIG. 18(b)).

In particular, a relationship between velocity (in the y-axis) and a distance from the centre of the sensors (in the x-axis) is shown in FIG. 18. Each of FIGS. 18(a) and 18(b) depicts individual velocity data items 90 of a fluid (which have been mapped to corresponding depth data based upon a depth factor), a fitted velocity profile 89, 89' generated based upon the individual velocity data items 90, and a reference flow distribution profile 88 of the fluid (i.e. a true profile). Both figures use the same set of mapped velocity data. As clearly shown, the fitted velocity profile 89 of FIG. 18(a) has a concave top which deviates from the flat top of the true profile 88. In contrast, the fitting velocity profile 89' with the improved Gauss-Newton algorithm better matches the true profile 88. That is, the true profile 88 comprises a region within the centre of the pipe of relatively uniform velocity, with velocity falling away towards the pipe walls. This profile is accurately estimated using a Gauss-Newton algorithm (FIG. 18(b)), but is not accurately estimated using a polynomial fitting algorithm (FIG. 18(a)).

It will be appreciated, therefore, that the use of a Gauss-Newton algorithm with additional fluid properties can allow a closer match between the generated data indicative of material properties and the actual material properties.

It will, of course be appreciated that such a fitting algorithm can be used in combination with any of the techniques described herein in order to generate an improved velocity profile from generated velocity data.

Furthermore, it will be appreciated that the various techniques described above in relation to the improvements in accuracy of generated data indicative of material properties can be used independently or in combination.

After a fitted velocity profile of a fluid is obtained (for example by using any of the techniques described above), rheology information (e.g. viscosity) relating to the fluid may be extracted from the profile. For example, a shear rate in the fluid can be obtained by differentiating the velocity of the fluid (with respect to the distance from the sensor surface), and a shear stress in the fluid can be obtained based upon the diameter of the pipe 79, and pressure measurements. A viscosity value of the fluid can then be calculated based upon the obtained shear stress and the shear rate.

Figure 19:
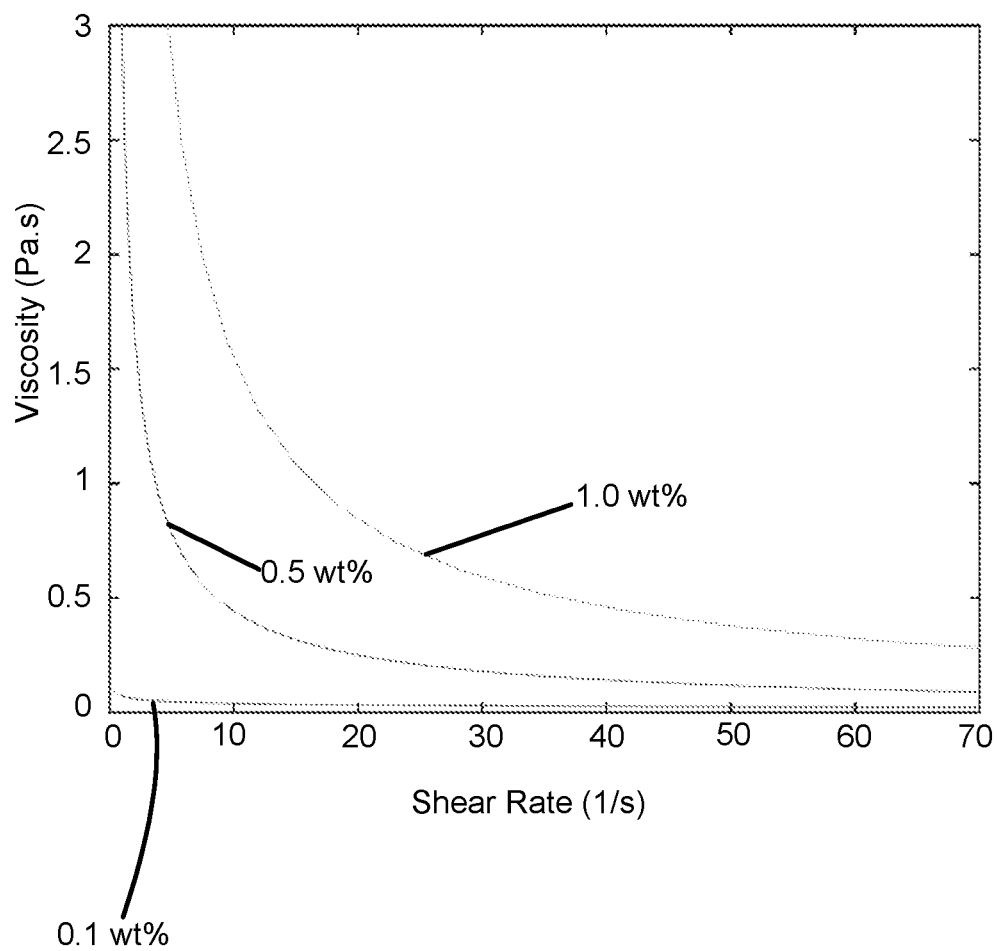
FIG. 19 illustrates plots of viscosity profiles of xanthan gum fluids with different mass fractions derived from data generated by the apparatus of FIG. 15.

For a Newtonian fluid, viscosity remains constant and is independent of shear rate. However, for non-Newtonian fluids (which tend to be more commonly found in industrial processes), viscosity is dependent upon the shear rate. Thus, In order to understand the rheological properties of a fluid, a rheology diagram such as a viscosity profile as shown in FIG. 19 may be used. Such a viscosity profile may be obtained based upon the fitted velocity profile as described above. That is, a relationship between viscosity and shear rate may be obtained based (at least partially) upon velocity data. Such a relationship may subsequently be used as a point of reference in subsequent processing.

The viscosity value and the shear rate of the fluid as calculated from the velocity profile may, for example, be used to determine whether the fluid or process meets a predetermined criterion, which determination may in turn be used in order to control an industrial process. In one such embodiment a process may be required to produce a material having a predetermined material characteristic, such as, for example, a predetermined mass fraction. In such an embodiment, data indicative of properties of the material (e.g. a viscosity value and a shear rate) may be compared to reference data indicative of a property of the fluid (e.g. a reference viscosity profile).

FIG. 19 illustrates viscosity profiles of xanthan gum fluids with different mass fractions, i.e., 0.1 wt %, 0.5 wt % and 1.0 wt %. These viscosity profiles are calculated based upon the velocity profiles of the xanthan gum fluids measured by the sensor 41'. In each of the illustrated profiles a relationship between the apparent viscosity (y-axis) and the shear rate (x-axis) is shown.

Xantham gum fluids having different mass fractions may be used as reference fluids to mimic fluids having different viscosities. In general terms, a fluid with a higher mass fraction is more viscous than another fluid with a lower mass fraction. As shown in FIG. 19, the viscosity profiles of the xantham gum fluids having different mass fractions obtained from the measurement results of the sensor 41' can be clearly differentiated from each other. The obtained viscosity profiles also exhibit repeatability across individual measurements. This demonstrates the ability of the sensor 41' to provide different viscosity profiles when different liquids flow through the sensor.

It will also be appreciated that the sensor 41' may be used as a rheology instrument, allowing rheology measurements of fluid to be performed during industrial processes. In practice, the rheological properties of commercial products (e.g. shampoo, conditioner, etc.) are routinely measured by a desktop based laboratory rheometer. However, this offline measurement may be time consuming and may not accurately represent a rheological property exhibited during an industrial manufacturing process. By using the sensor 41' as a rheology instrument, online rheology measurements may be performed during an industrial manufacturing process, avoiding the need for separate offline measurements to be performed.

Additionally, it will be appreciated that the sensor 41' may be used as a fingerprinting tool to determine whether a fluid has reached a predetermined property during an industrial manufacturing process. To perform such processing, reference rheology data (e.g. a viscosity profile) of a fluid having the predetermined property may be obtained. The reference rheology data may have been directly measured as described above using the sensor 41', for example if the fluid having the predetermined property has been processed previously. Alternatively, the reference rheology data may be obtained from external sources. During the industrial manufacturing process, rheology measurements may be performed on a fluid and the obtained results compared to the reference rheology data. If the results of the online rheology measurements are close to the reference rheology data, the fluid may be considered to have the predetermined property.

If, for example, xanthan gum solution having a weight percentage of 0.5% is required to be manufactured, it will be understood that the reference curve corresponding to 0.5 wt % can be used. In use, viscosity data (e.g., a part or whole of a viscosity profile) calculated based upon a velocity profile as described above can be compared to the reference viscosity profiles as shown in FIG. 19. If the calculated viscosity data lies near the viscosity profile corresponding to the mass fraction of 0.5 wt %, this indicates that the fluid under test is close to the desired mass fraction.

It will be understood that, in this way, reference data relating to a known relationship between properties of the material (e.g. viscosity and shear rate) can be used to provide information relating to a physical property of the material (e.g. mass fraction).

The system described above with reference to FIGS. 1 and 2 is described as having a current source 8 and voltage monitor 9. The current source 8 is an example of an energisation source. The voltage monitor 9 is an example of a monitor. However, it will be appreciated that any suitable form of energisation source may be used in combination with any suitable form of monitor. The energisation source may be any source which is capable of generating and injecting a suitable signal into the material 2.

For example, the energisation source may be a voltage source, the current supplied by which is monitored during measurements.

Furthermore, while the techniques described above are generally referred to as ERT, the use of signal phase (in addition to amplitude) information may also be referred to as electrical impedance tomography (EIT). That is complex impedances are considered in EIT, rather than simply the resistivity of a material. Complex impedance may be used to distinguish between different materials.

It will also be appreciated that while ERT is described above, ECT may also be used in some embodiments. Where ECT measurements are performed, electrode sizes may be increased in size, so as to allow for a measureable capacitance to be observed between the various ones of the electrodes. The processing required to determine material permittivities is generally similar to that described above to determine material resistivities or conductivities.

A wide range of materials can be characterised by the techniques described above. For example, materials characterised may include (but are not limited to): paint, ink, shampoos and detergents, toothpaste and cosmetics, foods (e.g. ice cream, yogurt, sauces, ketchup), topical medicines, industrial fluids (e.g. drilling muds, mineral processing in flotation tanks), and polymers. It will be appreciated that some of the materials which are characterised are aqueous, while others are oil-based. Moreover, aqueous materials are typically considered to be conductive, and as such ERT may be used. On the other hand, oil based materials (e.g. drilling muds and polymers) may not be considered to be conductive and may be characterised by ECT.

Energisations and measurements are generally described as being applied to, and taken between, pairs of electrodes. However, it will be appreciated that energisations and measurements may be made with reference to a common reference electrode, or a plurality of electrodes. As such, an energisation may be applied to a single electrode, and a potential measured at a single electrode. Furthermore, while sequential measurements are described, multiple measurements may be carried out in parallel. Where a common reference electrode is used, as few as three electrodes may be used in an electrode array.

The methods described above generally perform measurements which represents the resistivity of material within a pipe at a single moment in time. However, in order to improve the accuracy of this measurement, several measurements may be taken, and a temporal average calculated. The use of a temporal average allows the effect of fluctuations such as those caused by turbulent flow, to be reduced. Any convenient number of samples may be averaged as required.

In general, embodiments have been described in which arrays of electrodes are provided effectively in series along the length of a pipe (or around the inner surface of a mixing vessel), in the direction of expected material flow. However, it will be appreciated that alternative arrangements are also possible. For example, the first and second arrays may be provided effectively in parallel at different circumferential positions around the inner surface of a pipe (or at a different height within a vertically orientated mixing vessel).

Furthermore, in some embodiments, alternative alignments of electrode arrays may be used. For example, one or more of the electrode arrays may be arranged around a surface of a pipe or mixing vessel along a circumferential direction.

Alternatively, one or more of the electrode arrays may be arranged along a helical path formed around a surface of a pipe or mixing vessel.

It will further be appreciated that the same alignment need not be applied to each electrode array. For example, a near field array (or plurality of near-field arrays) may be aligned in a first direction whereas as a far-field array (or plurality of far-field arrays) may be aligned in a second direction different to the first direction (e.g. orthogonal to the first direction).

Further, different arrays of electrodes may be provided, at least in part, by common electrodes. For example, a first array of first electrodes may be provided having a first electrode spacing, and second electrodes may be provided between adjacent first electrodes, effectively halving the spacing between adjacent electrodes. In use, first electrodes (and only first electrodes) are initially used to conduct measurements. First and second electrodes are then be used to conduct measurements with a higher resolution (by using adjacent first and second electrodes). Such an arrangement would reduce the surface area required by the electrode arrays, and ensure that measurements taken by both first and second arrays relate to the same region of material—the field-of-view of the second array being entirely contained within the field-of-view of the first array, but providing a higher resolution.

While it is described above that sets of measurements are generally conducted in series, with measurements taken by a first array being followed by measurements taken by a second array, it will be appreciated that this is not a requirement. Moreover, the order of measurements can readily be adapted as necessary. Where cross correlation is carried out between measurements taken from pairs of first and second arrays, some consideration should be given the relative timing of the measurements, so as to ensure that any deduced material flow velocities are accurately calculated based on the relative positioning of the arrays. Further, where there is little risk of electrical cross-talk between regions of material being imaged (e.g. where there is effective isolation, either through the use of ground electrodes, or spatial separation) measurements can be carried out concurrently.

Moreover, while the use of distinct arrays of electrodes is described above, it is of course possible that sub-sets of electrodes within a large array are treated as separate arrays. For example, by performing sequential measurements with overlapping subsets of electrodes and gradually advancing along a longer array, it is possible to characterise overlapping regions of the material, effectively following a portion of material as it flows along a pipe. Further, rather than being limited to only performing measurements at the position of a ring sensor (as is the case in some known techniques) the position of a measurement in the direction of flow can be selected and altered as required.

Further still, while it is generally the case that electrode arrays provided at different axial positions along a pipe (in a direction of material flow) allow comparisons to be made between data obtained at different times, it will be appreciated that in some embodiments a comparison may be made between data obtained by a single electrode array during different time periods (e.g. using auto-correlation techniques). Such a comparison may enable flow speed information to be obtained (as described above) by use of a single electrode array which extends in the direction of flow of a material.

It will be appreciated that where cross-correlation techniques are described as being used to compare data obtained from different electrode arrays, other comparison techniques are also possible.

It is will be appreciated by one of ordinary skill in the art that the invention has been described by way of example only, and that the invention itself is defined by the claims. Numerous modifications and variations may be made to the exemplary design described above without departing from the scope of the invention as defined in the claims. For example, the precise shape and configuration of the various components may be varied.

The described and illustrated embodiments are to be considered as illustrative and not restrictive in character, it being understood that only the preferred embodiments have been shown and described and that all changes and modifications that come within the scope of the inventions as defined in the claims are desired to be protected. It should be understood that while the use of words such as "preferable", "preferably", "preferred" or "more preferred" in the description suggest that a feature so described may be desirable, it may nevertheless not be necessary and embodiments lacking such a feature may be considered as within the scope of the invention as defined in the appended claims. In relation to the claims, it is intended that when words such as "a," "an," "at least one," or "at least one portion" are used to preface a feature there is no intention to limit the claim to only one such feature unless specifically stated to the contrary in the claim. When the language "at least a portion" and/or "a portion" is used the item can include a portion and/or the entire item unless specifically stated to the contrary.

The invention claimed is:

1. A measurement apparatus comprising:
a plurality of first electrodes, each of the first electrodes being spaced apart by at least a first predetermined spacing;
a plurality of second electrodes, each of the second electrodes being spaced apart by at least a second predetermined spacing less than the first predetermined spacing;
an energisation source arranged to energise at least one of said first electrodes so as to cause an electric field to be established between at least one pair of said first electrodes, and to energise at least one of said second electrodes so as to cause an electric field to be established between at least one pair of said second electrodes;
a monitor arranged to detect a first measurement of an electrical parameter at at least one of said first electrodes in response to said energisation of at least one of said first electrodes and to detect a second measurement of the electrical parameter at at least one of said second electrodes in response to said energisation of at least one of said second electrodes; and
a controller arranged to generate data indicative of a property of a material within a first region extending a first distance from the first electrodes, and to generate data indicative of a property of a material within a second region extending a second distance, less than the first distance, from the second electrodes, based upon said first and second measurements.

2. The measurement apparatus according to claim 1 wherein the second predetermined spacing is less than half the first predetermined spacing.

3. The measurement apparatus according to claim 1 wherein the second distance is less than half the first distance.

4. The measurement apparatus according to claim 1 wherein the plurality of first electrodes comprises an array of first electrodes and/or wherein the plurality of second electrodes comprises an array of second electrodes.

5. The measurement apparatus according to claim 4 wherein the array of electrodes is a linear array.

6. The measurement apparatus according to claim 1 wherein the property of the material is a velocity of the material.

7. The measurement apparatus according to claim 1 further comprising a disruption source, wherein the disruption source is arranged to introduce a disruption to a flow of material, and wherein the controller is arranged to detect an effect of said disruption.

8. The measurement apparatus according to claim 7 where in the source is a heater.

9. The measurement apparatus according to claim 1 further comprising a second plurality of first electrodes.

10. The measurement apparatus according to claim 9 wherein the controller is arranged to generate data indicative of a relationship between the first measurement of the electrical parameter at at least one of said plurality of first electrodes in response to said energisation of at least one of said plurality of first electrodes and the second measurement of the electrical parameter at at least one of said second plurality of first electrodes in response to said energisation of at least one of said second plurality of first electrodes.

11. The measurement apparatus according to claim 10 wherein the controller is configured to determine a relationship between the first measurement of the electrical parameter at the at least one of said plurality of first electrodes, and the fourth second measurement of the electrical parameter at the at least one of said second plurality of first electrodes, and wherein the data indicative of a property of the material is based upon the determined relationship.

12. The measurement apparatus according to claim 1, further comprising:
a plurality of third electrodes, each of the third electrodes being spaced apart by at least a third predetermined spacing;
wherein the third predetermined spacing is less than the first predetermined spacing and greater than the second predetermined spacing;
wherein the energisation source is further arranged to energise at least one of said third electrodes so as to cause an electric field to be established between at least one pair of said third electrodes;
wherein the monitor is further arranged to detect a third measurement of the electrical parameter at at least one of said third electrodes in response to said energisation of at least one of said third electrodes; and
wherein the controller is further arranged to generate data indicative of a property of a material within a third region extending a third distance from the third electrodes based upon the first measurement, the second measurement, and the third measurement, wherein the third distance is less than the first distance and greater than the second distance.

13. The measurement apparatus according to claim 1, wherein:
the plurality of first electrodes extends in a direction of flow of a material;
the measurement apparatus further comprises a second plurality of first electrodes extending in a direction of flow of a material, the second plurality of first electrodes being spaced apart from the first plurality of first electrodes in a direction of flow of a material;
the energisation source is arranged to energise at least one of said plurality of electrodes so as to cause an electric field to be established between at least one pair of said plurality of first electrodes, and to energise at least one of said second plurality of first electrodes so as to cause an electric field to be established between at least one pair of said second plurality of first electrodes;
the monitor arranged to detect a third measurement of the electrical parameter at at least one of said plurality of first electrodes in response to said energisation of at least one of said plurality of first electrodes and to detect a fourth measurement of the electrical parameter at at least one of said second plurality of first electrodes in response to said energisation of at least one of said second plurality of first electrodes; and
the controller arranged to determine a relationship between the third measurement and the fourth measurement, and to generate data indicative of a property of the material within a region between the first and second pluralities of first electrodes based upon said determined relationship.

14. The measurement apparatus according to claim 1, wherein:
the plurality of first electrodes extend in a direction of flow of a material;
the energisation source is arranged to energise at least one of said plurality of first electrodes so as to cause an electric field to be established between at least one pair of said plurality of first electrodes during a first time period, and to energise at least one of said plurality of first electrodes so as to cause an electric field to be established between at least one pair of said plurality of first electrodes during a second time period;
the monitor is arranged to monitor the electrical parameter at at least one of said plurality of first electrodes in response to said energisation of at least one of said plurality of first electrodes during the first time period, and in response to said energisation of at least one of said plurality of first electrodes during the second time period; and
the controller is arranged to determine a relationship between the electrical parameter monitored at the at least one of the plurality of first electrodes during the first time period and during the second time period, and to generate data indicative of a property of the material within a region extending from the plurality of first electrodes based upon said determined relationship.

15. The measurement apparatus according to claim 1, wherein the controller is arranged to generate data indicative of a viscosity of the material and/or data indicative of the rheology of the material.

16. The measurement apparatus according to claim 1, wherein the controller is arranged to generate data indicative of the rheology of Newtonian fluids and/or non-Newtonian fluids.

17. The measurement apparatus according to claim 1, wherein the controller is arranged to determine a flow velocity profile of the material based upon the generated data using a fitting algorithm.

18. The measurement apparatus according to claim 1, wherein the controller is arranged to:
    generate a plurality of data items based upon the first measurement at the at least one of said plurality of first electrodes, each data item being indicative of a property of a material within a respective sub-region within said apparatus, wherein each of the plurality of sub-regions is associated with a respective predetermined nominal depth extending into the measurement apparatus from the plurality of first electrodes; and
    generate a plurality of depth data items, each of the plurality of depth data items being associated with a respective one of the plurality of data items indicative of a property of a material;
    wherein said generation of each of said a plurality of depth data items is based upon a respective predetermined nominal depth and one of a respective plurality of depth factors, each of the plurality of depth factors being associated with a respective one of the plurality of sub-regions within said apparatus.

19. The measurement apparatus according to claim 1, further comprising:
    a pipe, wherein, in use, a material is caused to flow within the pipe; and wherein:
    the plurality of first electrodes are associated with a surface of the pipe; and
    a width of at least one of the first electrodes in a direction substantially perpendicular to a direction of flow of material within the pipe is at least 20% of a perimeter of the pipe.

20. An industrial control system comprising a measurement apparatus according to claim 1, wherein the industrial control system is arranged to control a characteristic of an industrial process based upon said data indicative of a property of the material.

* * * * *